(12) United States Patent
Klosterman et al.

(10) Patent No.: US 11,729,111 B2
(45) Date of Patent: Aug. 15, 2023

(54) PLUGGABLE DATA RESOURCE MANAGEMENT CONTROLLER

(71) Applicant: NetApp, Inc., Sunnyvale, CA (US)

(72) Inventors: Andrew Joseph Klosterman, Cary, NC (US); Richard Nesbitt, Holly Springs, NC (US); Garrett Mueller, Cary, NC (US); Eirikur Sveinn Hrafnsson, Reykjavik (IS)

(73) Assignee: NETAPP, INC., San Jose, CA (US)

( * ) Notice: Subject to any disclaimer, the term of this patent is extended or adjusted under 35 U.S.C. 154(b) by 122 days.

(21) Appl. No.: 17/119,600

(22) Filed: Dec. 11, 2020

(65) Prior Publication Data

US 2022/0191151 A1 Jun. 16, 2022

(51) Int. Cl.
*H04L 67/563* (2022.01)
*H04L 47/78* (2022.01)
*H04L 47/80* (2022.01)
*H04L 47/762* (2022.01)

(52) U.S. Cl.
CPC .......... *H04L 47/781* (2013.01); *H04L 47/762* (2013.01); *H04L 47/808* (2013.01); *H04L 67/563* (2022.05)

(58) Field of Classification Search
CPC ... H04L 47/781; H04L 47/762; H04L 47/808; H04L 67/563
USPC ........................................ 709/225, 226, 227
See application file for complete search history.

(56) References Cited

U.S. PATENT DOCUMENTS

| | | | | |
|---|---|---|---|---|
| 7,043,481 | B2* | 5/2006 | Mullins | G06F 9/4493 703/2 |
| 7,167,862 | B2* | 1/2007 | Mullins | G06F 9/4493 |
| 7,716,360 | B2* | 5/2010 | Angelov | H04L 67/51 709/227 |
| 8,032,634 | B1* | 10/2011 | Eppstein | H04L 67/34 709/226 |
| 8,234,650 | B1* | 7/2012 | Eppstein | G06F 9/5072 718/100 |
| 10,782,990 | B1* | 9/2020 | Suarez | G06F 11/301 |
| 10,951,662 | B1* | 3/2021 | Forte | G06F 21/554 |
| 11,140,455 | B1* | 10/2021 | Woodruff | H04N 21/2187 |
| 11,457,080 | B1* | 9/2022 | Meduri | H04L 67/60 |
| 11,599,382 | B2* | 3/2023 | Mitevski | G06F 9/4843 |

(Continued)

*Primary Examiner* — Thu Ha T Nguyen
(74) *Attorney, Agent, or Firm* — Haynes and Boone, LLP

(57) ABSTRACT

Systems, methods, and machine-readable media for defining data formats, reflecting system states of managed systems, and managing aspects of those systems via a logically centralized proxy are disclosed. Resources may be represented within a resource provider definition, a package of data format and interaction methods used to instantiate a resource provider, which is a running instance of an executable from the resource provider definition. Users may submit new resource provider definitions, view a list of definitions, and delete definitions. A resource provider service may access the resource provider definition and instantiate a resource provider. The resource provider instance instantiated from the resource provider definition exposes an API, via the resource provider service, to manage data items defined for the resource(s) in the resource provider definition. When the resource is changed, information tracking the state may be updated to reflect the new state of the managed resource.

20 Claims, 8 Drawing Sheets

(56) References Cited

U.S. PATENT DOCUMENTS

| | | | |
|---|---|---|---|
| 2003/0177182 A1* | 9/2003 | Clark | G06F 9/5033 709/203 |
| 2014/0281909 A1* | 9/2014 | Pinto | G06F 9/45529 707/810 |
| 2014/0304398 A1* | 10/2014 | Carlen | H04L 67/34 709/224 |
| 2016/0044035 A1* | 2/2016 | Huang | H04L 9/30 726/4 |
| 2017/0180346 A1* | 6/2017 | Suarez | G06F 21/6209 |
| 2018/0359162 A1* | 12/2018 | Savov | H04L 41/0896 |
| 2019/0034224 A1* | 1/2019 | Mitevski | G06F 9/485 |
| 2019/0278928 A1* | 9/2019 | Rungta | G06F 9/5077 |
| 2020/0274934 A1* | 8/2020 | Smith | H04L 47/82 |
| 2020/0310915 A1* | 10/2020 | Alluboyina | G06F 11/1469 |
| 2021/0103499 A1* | 4/2021 | Alluboyina | G06F 3/067 |
| 2021/0103554 A1* | 4/2021 | Alluboyina | G06F 3/065 |
| 2021/0250422 A1* | 8/2021 | Mladin | H04L 67/34 |
| 2022/0012045 A1* | 1/2022 | Rudraraju | G06Q 30/02 |
| 2022/0158926 A1* | 5/2022 | Wennerstrbm | H04L 43/20 |
| 2022/0191151 A1* | 6/2022 | Klosterman | H04L 67/563 |
| 2022/0321567 A1* | 10/2022 | Klosterman | H04L 63/102 |

* cited by examiner

300

```
{
    <basic property schema UUID>: {
        "object UUID": <some UUID>,
        "parentUUID": <some UUID>,
        "createTime": <some date and time>,
        "modifyTime": <some date and time>
    },
    <schema UUID>: {
        <Data Format (e.g., JSON) contents compliant
        with the schema referenced by schema UUID>
    }
}
```

302 — basic property schema block
304 — schema UUID block

PLUGGABLE DATA RESOURCE MANAGEMENT CONTROLLER

TECHNICAL FIELD

The present description relates to containerized application data lifecycle management. More specifically, the present description relates to systems and methods for defining data formats, reflecting system states of managed systems, and interaction methods for managing one or more aspects of those systems via a centralized proxy.

BACKGROUND

Storage systems have expanded from simply being on-premises devices to the cloud, whether in a hybrid configuration, private cloud configuration, public cloud configuration, and so on. With that expansion, different sources of data may define their data differently from each other. As a result, there arises an unpredictable universe of data which enterprise customers seek to manage. In particular, data management, in contrast to storage management which manages day-to-day operations of the storage system holding a customer's data, involves interacting with the storage system to manipulate the data as desired.

Problems arise, however, from this heterogeneity of data definitions across locations, organizations, and sources of data. This may be defined in terms of a data container, which stores the data for a customer's desired application. Different customers may define their respective data containers differently from each other, as well as differently define the granularity at which their data is managed. Typically, this defining of the containers and the granularity would be handled on a case-by-case basis by different customers.

In particular, the heterogeneity of customer data definitions and granularity get in the way of a centrally managed system that would allow different customers to define their data, the granularity, and management differently from each other.

BRIEF DESCRIPTION OF THE DRAWINGS

The present disclosure is best understood from the following detailed description when read with the accompanying figures.

FIG. 3 illustrates an exemplary object definition of a resource used with a resource provider service architecture according to some embodiments of the present disclosure.

DETAILED DESCRIPTION

Figure 1:
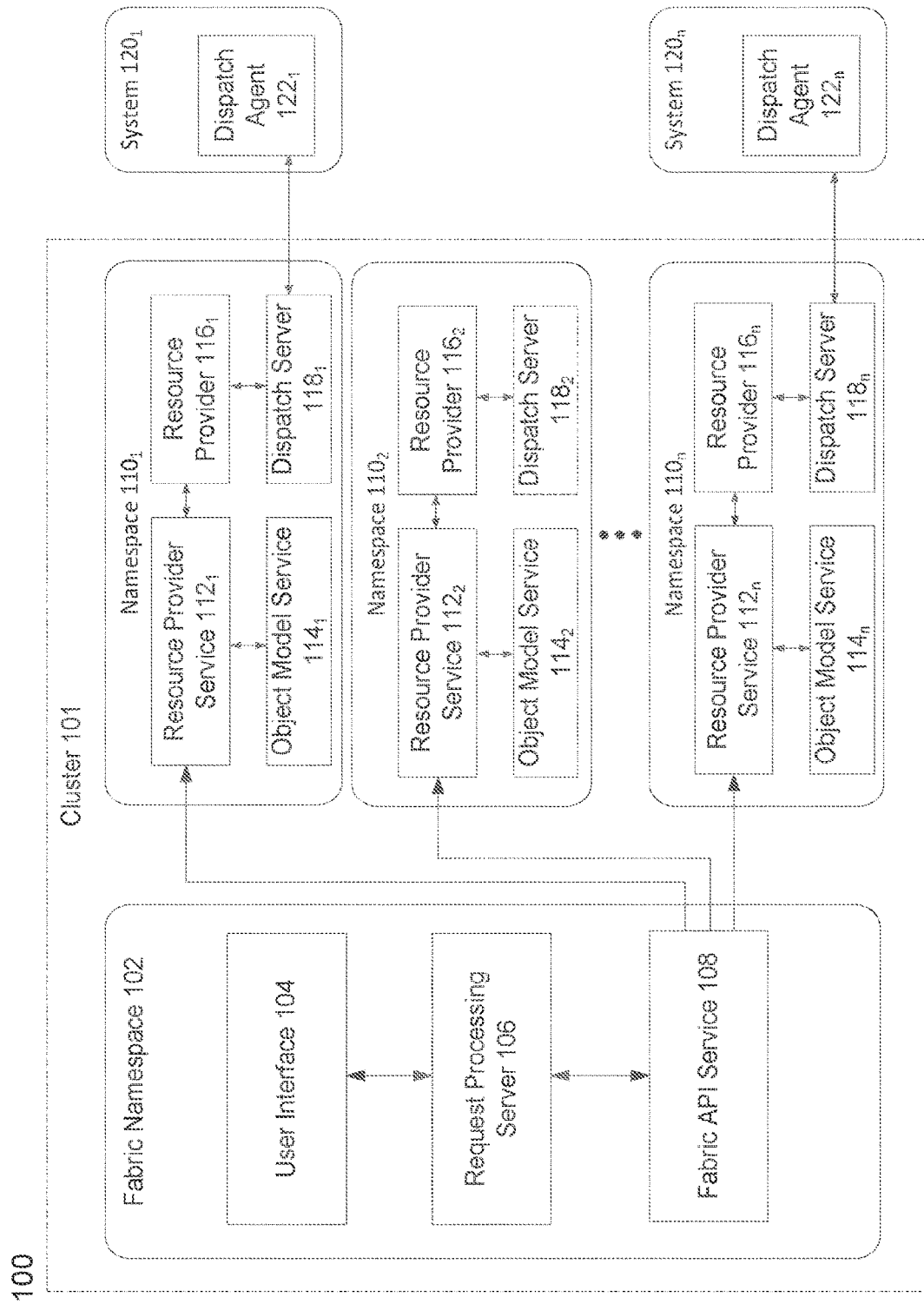
FIG. 1 illustrates an extensible data management platform architecture according to some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for defining data formats, reflecting system states of managed systems, and interaction methods for managing one or more aspects of those systems via a centralized proxy. In an embodiment, a data management architecture with centralized proxy includes a resource provider service, an object model service, and several application program interfaces (APIs) exposed to a client through the resource provider service for managing a resource provider (via the resource provider service) that represents a resource, which represents a state of a system or group of systems. Some examples of resources include "volumes" and "snapshots" (as just two simple examples).

According to embodiments of the present disclosure, resources may be represented within resource provider definitions. A resource provider definition may be a package of data format (e.g., describing the resource) and interaction methods used to instantiate a resource provider. An instantiated resource provider definition, variously called a resource provider or resource provider instance, may be a running instance of an executable that supports the data format and interaction methods from the resource provider definition. As such, a resource provider definition may include associated references to an executable, such as an executable container, that becomes the instantiated resource provider. Further, the resource provider definition may be stored in an object model service, and further include other information such as credentials for accessing the container and configuration arguments, and API specification which the resource provider service may expose on behalf of the running resource provider.

In operation, a user may access the resource provider service in an organization's namespace via a fabric namespace, which may also be referred to herein as either a data fabric namespace, or more generally as a namespace. The fabric namespace may correspond (implementation-wise) to orchestrator (e.g., Kubernetes) namespaces for tenant isolation (there also exist namespaces in an object model service that are used for aliases/translations, as discussed further with respect to various embodiments below). The user may contribute a resource provider definition to store in the object model service of the namespace (managed by the resource provider service) via an API call of the resource provider service. The resource provider definitions are formatted according to a metaformat, such that any type of data may be defined, and resources defined, so long as the overall resource provider definition complies with the metaformat. In this way, entities associated with the provider of the resource provider service, or third parties, may submit resource provider definitions for others to access. Any user (e.g., any user within the namespace) may subsequently access the resource provider definition if it corresponds to a resource that the user seeks to manage. In this way, customers may define their data containers, and the granularity at which they want to manage their data, while enabling the customers to define their data, what it looks like, and how to manage it.

The resource provider service may be configured to present a list to requesting users of all resource provider definitions, or some subset of resource provider definitions, stored in the corresponding object model service. When a user selects a resource provider definition to instantiate based on the target resource of interest to be managed, the resource provider service receives the request via an API call (which may include, for example, custom values and/or arguments that may customize the requested resource provider instance to the needs and/or circumstances of the requesting user at that time) and instantiates the resource provider based on the identified resource provider service (and any custom values and/or arguments to instill any unique characteristics/configuration). The resource provider instance that is instantiated from the resource provider definition exposes an API, via the resource provider service, that is defined to manage the data items defined for the resource(s) in the resource provider definition.

According to embodiments of the present disclosure, once the resource provider is instantiated, the resource provider service may allow the user to make API calls (e.g., that have been authenticated and authorized) to operations during actual use of the resource provider. The resource provider service may proxy these commands during operation for the resource provider. As the resource provider performs the requested operations after proxying by the resource provider service, the resource provider may make an internal API call to the resource provider service that updates a corresponding resource provider instance record in the object model service. This enables the object model service to accurately reflect a new state of the managed resource from the changes implemented by the resource provider.

Thus, the process of instantiating a resource provider may take a resource provider definition (which may be stored in the system already), and may cause the executable embodying the logic of that resource provider (e.g., a container may embody the logic) to begin executing with a particular set of arguments and/or custom values that may make the resource provider unique to the purposes of that user. That execution may be tracked by the resource provider service, and the API of the executable (the instantiated resource provider) may be exposed via the resource provider service to users upon instantiation. Operations may then be requested via the exposed API, which the resource provider service proxies for the resource provider instance.

As a result, embodiments of the present disclosure enable an extensible data fabric that accommodates native definitions as well as third party plugins. The resource provider service, and related architecture, enable interoperability of managed resources represented within objects. The facilitated convergence of multiple, independently-defined data formats from multiple resource providers allows for a single container (more generally, an executable such as a container, or a virtual machine, or a URL that accepts an argument to perform some action) to host a multitude of inter-related information. This allows natively-authored resource providers to interact with each other and/or with third-party-authored resource providers (when instantiated). As a result, data may be manipulated at different locations in a network and may be managed as a holistic entity (e.g., as a container of information that is located and manipulated, such as backed-up, copied, moved, accessed etc.). As used herein, data management may be viewed separately from storage management that relates to managing the day-to-day operations of the device/entity that holds data. That is, data management here in some aspects relates to interaction with the entity that performs storage management (e.g., managing the data itself) and defines what the data container is.

FIG. 1 illustrates an extensible data management platform architecture 100 according to some embodiments of the present disclosure. The architecture may be implemented over a single node of a distributed computing system, or a cluster of nodes. Each node may be, for example, a different physical server, while in other embodiments different nodes may be run on the same physical server. In some examples, the architecture 100 may be orchestrated using Kubernetes, which is an open-source system for managing containerized applications. More particularly, Kubernetes aids in the management of containerized applications across a group of machines (e.g., virtual machines).

The extensible data management platform architecture 100 includes a fabric namespace 102, namespaces $110_1$-$110_n$, and systems $120_1$-$120_n$ (e.g., on-premises, in the cloud, etc.—more generally, systems $120_1$-$120_n$ may be remote systems from the namespace 110, but accessible by the resource provider instance that manages the resource on the system 120). For example, the fabric namespace 102 and namespaces $110_1$-$110_n$ may exist within a Kubernetes cluster, such as a single cluster. Alternatively, one or more may be in separate clusters and in communication with each other over one or more networks. In addition to standard Kubernetes namespaces, the data fabric namespace 102 may be configured to provide a front-end of the architecture 100. This may include a user interface 104, a request processing server 106, and a fabric application programming interface (API) service 108. Aspects of the present disclosure may be discussed with reference to container and container-related implementations. This is for simplicity of discussion only. Aspects of the present disclosure are applicable to executables generally, such as virtual machine executables, uniform resource locator (URL) implementations where the URL receives some argument to perform a requested action (e.g., a URL to a REST API), a script, a compiled executable, etc. The examples described below may refer to container and container-related concepts to provide illustration of details of the disclosure.

The user interface 104 may include components used to handle user interfacing, and may include for example an API object that manages external access to the services in the cluster. This may be served out of a container through an ingress component to provide services such as load balancing, name-based virtual hosting, and/or secure socket layer (SSL) termination. For example, a user may login to a namespace (e.g., any of namespaces $110_1$-$110_n$ in examples of the present disclosure), such as for purposes of authentication and/or authorization prior to using features as discussed further herein. The request processing server 106 may be in communication with the user interface 104, for example receiving incoming requests that were received from a user through the user interface 104. The user interface 104 may facilitate authentication and display of information for users, with the underlying API(s) providing a way to prove user identity and gain authenticated access; if provided with a valid authentication token, for example, the API(s) may permit operations to proceed. While described with respect to interaction via user interface 104, in some other examples a user may directly address the API endpoints to accomplish tasks, or use one or more scripts to directly interact with a request processing server 106. In other words, based upon the services exposed by the request processing server 106, users may interact with the system via the user interface 104 or via scripted interactions directly to the underlying API(s). The request processing server 106 may then build a set of requests that may be used to obtain information identified in the incoming request. The request processing server 106 may then send the built set of requests to the fabric API service 108.

The fabric API service 108 may operate as a front-end to the organizational tenancy structure of the architecture 100. In this capacity, requests received via the user interface 104 may pass through the fabric API service 108, where the fabric API service 108 may authenticate the request. This may include, for example, authenticating the request's authentication token against internal data, e.g. authenticating against the request's auth0 token. More generally, a bearer token may be authenticated against any token-providing service, such as for example a simple internal token-to-user mapping service. If authentication is successful, the request may then be routed to the appropriate organization's namespace (e.g., $110_1$-$110_n$), and in particular to the appropriate resource provider service 112 of that namespace 110. Further, the fabric API service 108 may be configured to be able to dynamically update its API space based on the organizations it serves, as well as the resource providers (e.g., $116_1$-$116_n$) that are instantiated (if any) in each organization's namespace 110. Such functionality may allow for a restricted, whitelisted organization-based API space with a layer, such as a first layer, of access control based on the existence of a user in an organization and appropriate authentication information.

The extensible data management platform architecture 100 may also include, in addition to standard Kubernetes (or other construct) namespaces, one or more namespaces $110_1$-$110_n$. These namespaces, for example, may be ascribed to different tenants to maintain isolation of data and access. Each namespace 110 may include one or more of a resource provider service 112, an object model service 114, one or more resource providers 116 (e.g., instances of resource providers based on resource provider definitions stored with the object model service 114), and a dispatch server 118. For example, a namespace 110 may start with zero resource providers 116, with instances of resource providers 116 being instantiated over time.

For example, namespace $110_1$ may include a resource provider service $112_1$, one or more resource providers $116_1$ (when instantiated), and the dispatch server $118_1$. The resource provider service $112_1$ may be in communication with object model service $114_1$, as well as in communication with resource provider $116_1$. The resource provider $116_1$ may, in turn, also be in communication with a dispatch service $118_1$, which may be in communication with a system $120_1$ via dispatch agent $122_1$ (e.g., more generally referring to an agent that may be used to tunnel data in order to support management of other devices). While illustrated with one resource provider 116, any given namespace 110 may include one or more resource providers 116 at any given point in time, depending on what a client requests be instantiated via the fabric namespace 102.

Namespace $110_2$ may similarly include a resource provider service $112_2$. Resource provider service $112_2$ may be another instance of the resource provider service $112_1$, just within a different namespace. Resource provider service $112_2$ may be in communication with object model service $114_2$, as well as in communication with resource provider $116_2$. The resource provider $116_2$ is not illustrated as being in communication with a dispatch service 118 because, in the illustrated example, the namespace $110_2$ is not in further communication with an on-premises system (or otherwise protected system), as namespace $110_1$ and namespace $110_n$ are (by way of illustration). For example, dispatch server 118 is optional. As a further example, namespace $110_n$ (an example showing that any number n of namespaces 110 may exist within the architecture 100 of FIG. 1) may include a respective resource provider service $112_n$. That resource provider service $112_n$ may be in communication with object model service $114_n$, as well as in communication with resource provider $116_n$. The resource provider $116_n$ may, in turn, also be in communication with a dispatch service $118_n$, which may be in communication with an on-premises system $120_n$ via dispatch agent $122_n$.

Referring generally to the resource provider service 112 within a namespace 110, this component serves as the API proxy for resource providers 116. For example, resource provider service $112_1$ may serve as the API proxy for resource provider $116_1$, resource provider service $112_2$ may serve as the API proxy for resource provider $116_2$, and resource provider service $112_n$ may serve as the API proxy for resource provider $116_n$. In general, each resource provider service 112 may serve as the API proxy for any number of resource providers 116 within the same namespace 110. For example, the resource provider service 112 may be responsible for instantiating the resource providers 116 within its namespace 110, as well as may be responsible for exposing the API(s) that the resource provider(s) 116 (that have been instantiated within the namespace 110) exposes. The resource provider service 112 may expose these APIs as proxied routes as described herein.

The resource provider service 112 may further provide a RESTful API endpoint for one or more resource providers 116 within the same namespace 110 (e.g., to maintain their resources. Further, a resource provider service 112 may provide a variety of system resources, including support for notifications and banners, a resource retrieval API for platform consumers, lifecycle functions for resource providers 116 (e.g., such as those within the same namespace 110), and/or activity and audit logging as some examples. The resource provider service 112 may be implemented as a software entity, such as a logically centralized REST API proxy that runs within the containers within a Kubernetes compute and storage cluster of networked computers (virtual or physical). In an embodiment, a container may be, for example, a Docker container or a CoreOS container. A container may refer to a standardized unit of software that packages executables and dependencies for those executables in a package to allow for quick installation and ensure that the software runs as expected. In an embodiment, the container may be a container management tool such as, for example, a Kubernetes Pod, a Mesos Containerizer, or a Docker swarm (to name a few examples). A container management tool may manage one or more containers along with any shared storage or network connections and provides configurations for running the containers.

The resource provider service 112, generally, may utilize the object model service 114 for storage of objects representing information that may be used for operation of the resource provider service 112, as well as for storage for resources managed by executables to which the resource provider service 112 proxies access. For example, the objects may be JavaScript Object Notation (JSON) objects, or other types of objects (such as YAML (YAML Ain't Markup Language) or XML (eXtensible Markup Language) as two examples). Generally, then, the object model service 114 may be responsible for maintaining the resource storage and management in the architecture 100. This may include maintaining the Resource "definitions" as schemas (e.g., JSON schemas, such as Draft 4 or another) for the platform as well as for a corresponding resource provider 116 (e.g., instantiated based on a resource provider definition stored in the object model service 114). A schema may describe the format for content of an object (e.g., a schema might specify that a property key with a name may have a string of a given length for its value, so that a schema-compliant object may be a string of that length). Each object and schema may be internally accessed by a universally unique identifier (UUID), and each schema may be internally represented as the names for stanzas by the UUID for that respective schema. A UUID may be, for example, a hexadecimal character string (such as 32 hexadecimal characters as one example).

The object model service 114 may further be responsible for providing one or more namespaces. These namespaces provided for by the object model service 114 may be distinct from the namespaces 110 illustrated in FIG. 1, for example existing for the convenience of human access so that programmers may work with friendly names (that may be associated with one or more UUIDs) instead of UUIDs directly when working with stanzas within objects. The object model service 114 may also be responsible for allowing the insertion of aliases and translations into the namespaces provided by the object model service 114. Further, the object model service 114 may be responsible for validating inserted Resources against the schemas, and/or storing and retrieving the Resources and their accompanying metadata. This extensible object model may allow for the composition of Resource "stanzas" using cooperating resource providers (e.g., providers 116) and other components of architecture 100. This may give the overall system flexibility to support complex resource models that may be collectively maintained (e.g., in the object model service 114). The object model service 114 may further provide a RESTful API that is available to the resource provider service 112 (but which might not be directly available to any other components), such that resource operations performed by any resource provider 116 might be performed using the resource provider service 112's RESTful API. For example, access from the resource provider 116 to the object model service 114 via the resource provider service 112 may be allowed in order to permit easier auditing of those accesses and logical centralization of triggerable actions based upon access of different types.

The object model service 114 may create its own schema for basic properties for schema object and other objects. This may be done at bootstrap, for example. Subsequent schemas and objects may comply with this basic schema (e.g., also referred to herein as a system schema). As one example, some basic properties of a schema or object may be an object UUID, a parent UUID, a create time, and a modify time. The date and time information may be strings (e.g., alphanumeric strings, or strings that may include other printable characters such as semicolons and periods, etc.) in a format such as ISO 8601, and may be formatted with a UTC time base. Phrases within an exemplary object may be delimited, such as with "<" and ">", which may be placeholders for the concept represented between the delimiters. The basic schema may be a special schema for objects where the object UUID and parent UUID equal each other. Further, a meta schema may be used to indicate that an object consists of one or more schema stanzas. For example, the meta schema may describe that objects consist of contents identified by UUID and object information, e.g. <schema UUID>:<object> contents. Schema definitions, e.g. JSON definitions, may exist for the meta schema, schema definition(s), and object definition(s). In general, the object model service 114 may store one or more schema definitions according to a schema, and objects according to a meta schema that references schema definition(s) by UUID (with optional translation via an object model service namespace).

When a schema is installed in the object model service, it may be represented as an object with a basic property stanza and an object (e.g., a JSON object) to hold its own schema (e.g., JSON schema), for example according to a meta schema. As used herein, therefore, a stanza may refer to a separable, self-contained, stand-alone unit of information. The name of each stanza may map back to a JSON schema. At install time, the new schema may be validated (for example, to avoid accepting, storing, and applying an illegal schema). The format for schema objects may be pre-defined and expected to consist of several components, such as two including the basic object properties and the schema component. Thus, there may be two stanzas for a schema object: an "object" stanza and a "schema" stanza. The object stanza may contain the properties described above (e.g., the basic properties that the object model service 114 creates such as at bootstrap).

The schema stanza may contain a JSON schema, and conform to JSON Schema rules (e.g., Draft 4). Reference to JSON and JSON schema is by way of example only. More generally, a data format and description of what content is considered allowed for the data format may be used for an object/representation of data. Embodiments of the present disclosure may use any appropriate representation of data objects (such as JSON) and a meta-description/schema that may describe what the content of an object is allowed to be (e.g., what should be included, what is optional, etc.), and any acceptable formats for that content (e.g., string, integer, date, nested-object, etc.). Reference is made to JSON and JSON schema herein for ease of discussion and illustration, with the concepts applicable to other data formats as noted. To represent the properties of a schema in an object, the object may appear with the object UUID of a schema object as the name for the object property stanza(s). As a result, the object model service 114 may be able to look up the referenced schema and validate the contents of that object property stanza.

An example of this is illustrated in FIG. 3, which illustrates an exemplary object definition 300 of a resource used with a resource provider service architecture according to some embodiments of the present disclosure. In the example, object stanza 302 includes the basic information including the basic property schema UUID, object UUID, parent UUID, create time, and modify time. The schema stanza 304 may contain a JSON schema (as an example; alternatively YAML, XML, etc.). The "schema UUID" of the schema stanza 304 may denote a particular schema object containing the JSON schema to be used to validate what is represented within "Data Format (e.g., JSON) contents compliant with the schema of schema UUID."

There may be multiple instances of different schema-defined object property stanzas within a given object, which gives the overall object model of the object model service 114 flexibility. Flexibility comes down to how the object model may be used. The schema-defined stanzas support the flexible object model. An object may be created with an initial set of stanzas, more schemas may be added to the system, and then more stanzas may be added to the initial object with the new stanzas. Additionally, one or more stanzas may be removed, or have their contents modified, over time. This flexibility may allow new use cases for objects to be added at any time. This same flexibility may allow for cooperating within a given object by adding use-case-specific object property stanzas where the contents of each stanza may be viewable by users of the object model service 114, and where each stanza's schema may be consulted to learn details of their semantics.

Returning to FIG. 1, given that the object model service 114 may track UUIDs as the names for schema-defined stanzas, and given that UUIDs are often not easily interpreted or understood in their native form, the object model service 114 may further be configured to translate from UUIDs to legible character strings. The translations may be defined within namespaces (e.g., within object model service 114, as opposed to namespaces 110). The translations may be used by the resource provider service 112 to hide the existence of the UUIDs so that a resource provider 116 might be exposed to the translated UUID, as opposed to the "raw" UUID. Further, a limit might not be enforced on the number of namespaces and/or the number of translations/aliases per namespace. In this context, a namespace may refer to a logical container for aliases. Each alias may translate from an input argument to an output (the translation). The object model service 114 may be requested to use aliases from a particular namespace when translating inbound/outbound object arguments. The object model service 114 may use, internally, schemas and objects to manage the namespace and alias feature. The author of a resource provider 116 may be able to define every aspect of the resource using schemas, such as JSON schemas, and map those schemas to aliases as noted. These aliases, then, may be short-hand common names that automatically map from a specific resource stanza to the defining schema.

The resource provider service 112 may instantiate one or more resource providers 116 from corresponding resource provider definitions within the object model service 114. A resource provider definition may be the package of data format and interaction methods used to instantiate a resource provider 116. Thus, a resource provider 116 may be schemas and pieces of code that define the resources that the resource provider 116 represents within the architecture 100, that create a RESTful API that the architecture 100 can utilize to assist in the retrieval and management of those resources, and that implements the code behind the RESTful API that will actually perform the retrieval and management of those resources. A resource provider definition may support one or more data definitions, up to any number of data definitions. Resource provider definitions that contain a large number of definitions (e.g., as defined either by a threshold set automatically or by a user, or by one or more capabilities of the system(s) in operation, etc.) may, if they become too large, be factored into multiple smaller resource provider definitions. This may be useful, for example, in situations where a system might impose a limit on how many data definitions can be proposed or installed by a resource provider definition—re-factoring may be thus used to circumvent such limitation. The resource provider 116 may be a running instance of an executable that supports the data format and interaction methods specified in a resource provider definition.

A resource provider definition, stored in the object model service 114, may include a JSON object and associated external references to an executable, such as an executable container. The container may be the executable to be run for each resource provider 116 that is instantiated from that resource provider definition. The JSON object may include a reference to a repository location (such as a Docker repository location) from where the executable container can be downloaded. The JSON object may also include the credentials used for accomplishing a download of the container, as well as a schema describing configuration arguments (such as schema stanza 304 from FIG. 3, those needed to craft a unique resource provider 116 instance from the resource provider definition from the object model service 114), a set of mandatory configuration arguments (such as network ports), an API specification (such as OpenAPI), a definition (such as OAS3) of the REST API implemented by the executable container, and JSON schema definitions of resource objects to be managed by the instantiated resource provider 116.

As used herein, "resources" (or "resource objects") may refer to objects that are stored in the architecture 100. Resources are how the state of a system, or a group of systems, may be reflected within the architecture 100, and how management capabilities may be provided to those systems. Some simple examples of resources may be "volumes" and "snapshots" (as two simple separate examples). Another example could be, for example, a representation of a building management system. There may be a building management system resource provider (e.g., instantiated from a corresponding resource provider definition) with defined resources such asthermostats, door sensors, light sensors, occupancy sensors, controllable lights, etc. As these examples illustrate, a resource provider 116 may be a representation of the underlying resource(s) that provides a level of access/management at the given level of granularity for that resource per the resource provider definition from which the resource provider 116 is instantiated. In operation, the resource provider 116 instance may communicate with the actual physical entity(ies) (the "resources") and reflect their current state into the object model service 114 (and manage them via one or more API calls from a client exposed via the resource provider service 112). Further, as commands are received to manipulate the actual physical entity(ies) via the resource provider 116, an update to the actual physical entity(ies) may occur as well corresponding to the changed state updated into the object model service 114. Thus, where a resource provider 116 instance API receives a command to cause an object to be created, that object would be created at the actual physical entity(ies). As another example, where the resource provider 116 instance represents an NFS file server and receives a command for a storage volume to be created, an actual corresponding volume would be created at the actual, managed NFS file server (in addition to the state being updated at the object model service 114).

The concept of resources may be taken further within embodiments of the present disclosure. For example, the architecture 100 (such as via the resource provider service 112) may provide metadata to the resources including basic system information such as creation time, last modification time, and resource parent (as represented by the object stanza 302 in FIG. 3, for example). The metadata may also include resource information, such as display name, and a set of external IDs that allow for a resource provider 116 to map from an external resource identifier to a unique identifier within the system that the resource is representing.

Further, an object in the architecture 100 may be an amalgamation of several resources, created and maintained by one or more resource providers 116. It is through this composition mechanism that the architecture 100 may add the metadata and resource information maintained on a per-resource basis. Thus, a developer may create a generic/specific set of resource providers 116 that cooperatively may maintain resources for several types of systems. Generic/specific set of resource cooperation may be enabled by the object model. This cooperation may enable the generic resource provider to have some basic understanding of the interface supported by the specific resource provider(s).

When a user seeks to instantiate a resource provider 116, they may send a command via the fabric namespace 102 (through user interface 104, request processing server 106, fabric API service 108, etc.), that is routed to the appropriate namespace 110. The resource provider service 112 in the appropriate namespace 110 may be waiting for the command, in the form of an API call as an example, to create a running instance of a resource provider definition stored in the object model service 114. The command, such as API call, may define the necessary configuration parameters to use to instantiate the resource provider 116 from the definition. Herein, discussion will refer to API calls for simplicity, though the command and related communication may refer to other types of communication instead or in addition, such as passenger-pigeon, remote procedure call (RPC), a custom protocol, a "mailbox and doorbell" implementation, and/or polling. With this, the resource provider 116 is instantiated. The resource provider 116, when running, may provide access to manage resources defined by the data format described in the resource provider definition (see FIG. 3 as an example), and which the resource provider service 112 had before installed in the object model service 114.

The resource provider service 112 may proxy an interface of the resource provider 116 instance (e.g., an OAS3 interface) to clients. The resource provider service 112 may proxy interactions from the resource provider 116 instance to create, modify, and/or delete objects stored in the object model service 114. Further, the resource provider service 112 may proxy read access to objects (such as resource provider definition(s)) stored within the object model service 114 as well (which might not be directed at the resource provider 116 instance). In some examples, only resource provider 116 instances that derived from a resource provider definition that defined a given data format may alter the contents of the record(s) conforming to that format, while any resource provider 116 instances (e.g., those that are not derived from that resource provider definition) may read the contents of sub-components of objects. That is, while any accessor of an object can read the contents of all stanzas of that object, only a resource provider 116 instance derived from the resource provider definition that introduced a particular stanza definition might be able to modify those stanzas.

As illustrated, resource provider 116 instances may be in communication with a dispatch server 118. As illustrated, for example, resource provider $116_1$ in namespace $110_1$ may be in communication with dispatch server $118_1$. Further as an example, resource provider $116_2$ of namespace $110_2$ may be in communication with optional dispatch server $118_2$. Where there is no on-premises system 120 to connect with, the dispatch server $118_2$ may be omitted. The dispatch server 118 generally may provide for a capability that allows for communication between the cluster 101 and on-premises systems 120 (or otherwise protected systems wherever they may exist across one or more networks, such as in the cloud, etc.). The dispatch server 118 may reside within the cluster 101, or may be an external service that one or more components of the cluster 101 connect to for punching through firewalls wherever they may exist across the Internet to allow a resource provider 116 to connect to an on-premises system 120. A dispatch agent 122 may reside in a given on-premises system (or otherwise protected system). Thus, as illustrated a dispatch agent $122_1$ may reside in on-premises system $120_1$, and dispatch agent $122_n$ may reside in on-premises system $120_n$.

In operation, a dispatch agent 122 may open a connection from the dispatch agent 122 to a corresponding dispatch server 118. The dispatch server 118 and the dispatch agent 122 in communication may use the existing connection opened between them as a tunnel to send information between an entity that connects to the dispatch server 118 (e.g., one or more resource providers 116 within a namespace 110) and the entity connected to the corresponding dispatch agent 122 (e.g., a corresponding on-premises system 120).

The cluster 101 may further include a logging subsystem, such as within fabric namespace 102 and/or within one or more of the namespaces 110, that pulls logs from the containers and stores them. Examples of logging stacks may include Elastisearch, Fluentd, and/or Kibana to name just a few. A microservice gateway may also reside in the cluster 101 that may provide a filtered view of the logging data through the fabric API service 108 to the user interface 104.

In some examples, the resource provider service 112 may also be configured to perform operations at bootstrap. For example, at bootstrap the resource provider service 112 may ensure that it can contact the object model service 114. If so, the resource provider service 112 may read one or more objects stored in the object model service 114 to recover any existing configuration, and/or create missing configuration objects. The resource provider service 112 may discover one or more resource provider 116 instances that may be expected to be running and, upon discovering any, may start those that the resource provider service 112 finds missing from the cluster 101. Further, during steady-state operation, the resource provider service 112 may respond to API requests that cause it to manage resource provider definitions and resource provider 116 instances. The resource provider service 112 may also, during steady-state operation, respond to API requests that cause it to proxy access to the APIs of resource provider 116 instances and to the object model service 114 as further discussed below.

The extensible data management platform architecture 100 may facilitate convergence of multiple, independently-defined data formats from multiple resource provider 116 instances, as sub-components of objects, may allow for a single container of information or object to host a multitude of inter-related information. This may allow, for example, a resource provider 116 instance defined by the provider of the architecture 100 to interact with other resource provider 116 instances defined by the same provider. It may also allow interaction with third-party resource provider 116 instances—that is, instances from resource provider definitions submitted to the architecture 100 from a third party to the provider of the architecture 100.

As an example, the provider of the architecture 100 may define a resource provider for an NFS (Network File System) volume and another for a snapshot tool that has received information informing it to assist with coordination and management of snapshots of specified NFS volumes. After both are instantiated as resource providers 116 respectively, they may coordinate and manage snapshots of particular NFS volumes per their definitions. As another example, third-party resource provider 116 instances may interact with each other. As an example, a third-party (e.g., a customer of the architecture 100, a contract developer, a startup, etc.) may interact with the NFS volume resource provider 116 to extend functionality via an information lifecycle management (ILM) annotation (e.g., as an object sub-component with a resource provider 116 instance to enable ILM functionality).

As can be seen, there can be many parties with access to the cluster 101 (e.g., provider of the architecture 100 as well as third-party contributors, etc.). Each may have a vested interest in conveying and consuming information about the "state" of a managed data resource (examples of states being e.g. ready, in-progress, deleted, unavailable, retrying, successful to name just a few examples). The resource provider service 112 may further include a state mechanism that provides a data structure with two elements, a sentiment (which may be represented as an integer value, such as between −100 and 100 or some other range), and a message (which may be a free-form text string that may be conveyed to parties interested in the status of a resource). A small set of conventions regarding the use of this data structure may allow many use cases for conveying the status of resources in the cluster 101 to be addressed.

Without a simple, compact, and centrally managed mechanism such as the state mechanism, each contributor or other component of the architecture 100 may otherwise have had to author its own solution for conveying state information and teach others about its particular implementation. Furthermore, in an environment where there are unpredictable third-party providers of code that define their own custom resources, the state mechanism may be a standardized means for providing information to the overall cluster 101. By applying machine learning techniques to preserved state mechanism information, interested parties may learn about the internal state transitions of third-party code and develop models predicting outcomes based upon initial conditions that are of value to the provider of the architecture 100 and/or its customers. For example, the provider of the architecture 100 may build machine learning models that predict outcomes based upon initial condition and feed this information back as a "value add" to interested customers.

In some embodiments, the state mechanism may be an opt-in mechanism. For example, the existence of the state mechanism may allow for the user interface 104 (e.g., presented via a graphical user interface) to auto-create progress bars and display other graphical elements without having explicit knowledge of the underlying system. The state mechanism may be a generic means by which the sentiment and message may be conveyed to parties interested in the status of a resource. The sentiment, which again may for example take an integer value between −100 and 100 (as just one example, and where the extremes may be assumed to be terminal states), and the flexibility of the integer value, allows for negative sentiment to be conveyed with negative numbers (e.g., −25 representing the first failure out of 4 attempts at retrying an operation) and positive sentiment with positive numbers (e.g., 40 representing 40% progress through an operation, 100 representing an expected terminal "success" state for a resource).

Further, the state mechanism may have its own schema installed by a resource provider service 112 in the object model service 114. This may allow the state mechanism to have its own stanza be stored within objects. This may enable state to be tracked on a per-stanza basis within objects (e.g., the state mechanism can track the state of multiple stanzas within a single object). A resource provider service 112 may provide an API, such as a REST API, endpoint for manipulating the state for a particular object property stanza within a particular object. Since "objects," as already noted, represent "things" within the architecture 100, objects may be composed of individual object property stanzas that are each defined by specific installed schemas (e.g., JSON) at the object model service 114. The resource provider service 112 may track the name of each of these stanzas, and the state mechanism can allow the resource provider service 112 to track the sentiment and message for particular stanzas within an object with its own stanza that is hosted within the object.

An exemplary JSON object with the state mechanism included may look like:

```
{
    "baseobject": {
        "objectUUID": "<some object UUID>",
        "parentUUID": "<some object UUID>",
        "createTime": "<some time and date>",
        "modifyTime": "<some time and date>"
    },
    "some object property stanza": {
        "some property": "some value"
    },
    "another object property stanza": {
        "another property": "some value"
    },
    "statemechanism": {
        "some object property stanza": {
            "sentiment": 50,
            "message": "create in progress, half-way done!"
        },
        "another object property stanza": {
            "sentiment": -33,
            "message": "first of 3 retries failed"
        }
    }
}
```

FIG. 3, as discussed above, explains other details of the object format including the object stanza (basic information, identified as the "baseobject" in this example) and the schema stanza (a JSON schema, for example, identified as the "some object property stanza" and "another object property stanza" in the above example). This is followed by the state mechanism, "statemechanism" with defined object property stanzas with corresponding sentiment values and message strings to be used for the state mechanism messaging. In some examples, the "statemechanism" stanzas may be represented as UUIDs (as opposed to more user-readable names), for example as a result of not knowing what object model service namespace/alias to use internally for translation (e.g., to track the referred stanza(s) by UUIDs).

The state mechanism may be useful according to embodiments of the present disclosure because it is simple (the sentiment as a simple integer value, and the message as a free-form text field), applicable to zero, one, or multiple object property stanzas within a single object (if zero, it would not be present), is interpretable by the user interface 104 with zero foreknowledge (which may be key to easy interoperability of independent code, e.g. from third parties), provides a basis for machine learning, and/or may capture events interpretable as good with positive numbers and those interpretable as bad with negative numbers (or some other arrangement).

Figure 2:
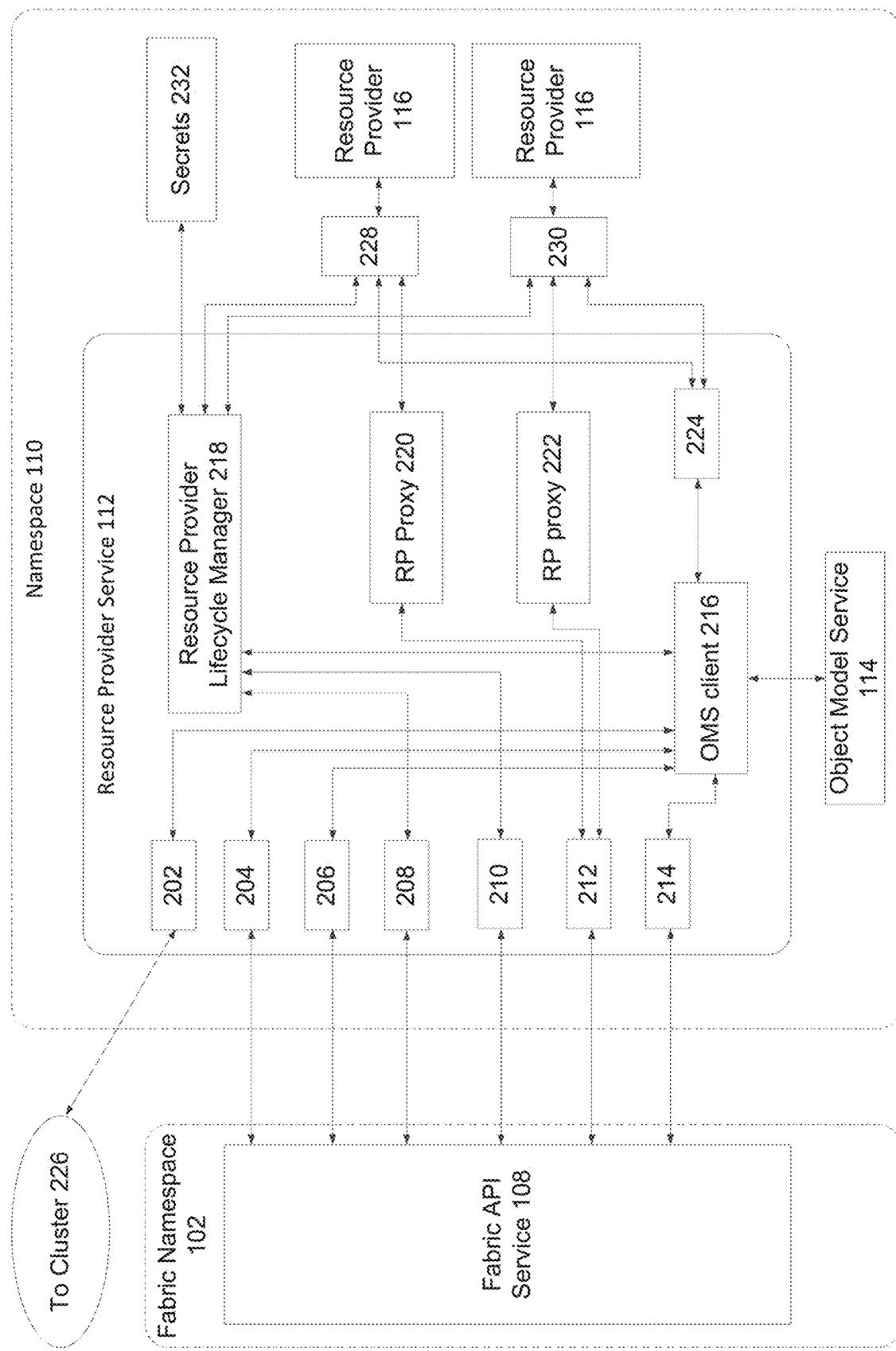
FIG. 2 illustrates a resource provider service architecture of an extensible data management platform architecture according to some embodiments of the present disclosure.

Additional operational details of the architecture of FIG. 1 will now be described. FIG. 2, specifically, illustrates a resource provider service (e.g., resource provider service 112 from FIG. 1) architecture of architecture 100 according to some embodiments of the present disclosure. Components introduced with respect to FIG. 1 will be referred to with same reference numbers, with additional details provided herein with respect to components of an exemplary resource provider server 112 that are useful in describing aspects of operation of the components according to embodiments of the present disclosure. Aspects of FIG. 1 not illustrated in FIG. 2 are merely for the purpose of highlighting those aspects illustrated in FIG. 2, and are still interoperable as discussed elsewhere herein.

Resource provider service 112 includes several APIs, illustrated as APIs 202, 204, 206, 208, 210, 212, and/or 214 (that is, the resource provider service 112 may include some subset of APIs 202-214 or all of them and/or more). The resource provider service 112 may also include an object model service (OMS) client 216. The OMS client 216 may be the interface within resource provider service 112 for communication with the object model service 114. In some implementations, OMS client 216 may be optional, with some or all of the components within the resource provider service 112 logically communicating with the OMS 114 via some other path, either through another client or directly in connection with the OMS 114. The resource provider service 112 may also include resource provider lifecycle manager 218, which may in communication with at least APIs 208 and 210, as well as with the object model service 114 via OMS client 216.

The resource provider lifecycle manager 218 may be in communication with the deployed resource providers 116 that are currently instantiated and in operation. When a resource provider 116 is deleted, that connection is removed. For example, the resource provider lifecycle manager 218 may be in communication with instantiated resource providers 116 via services 228, 230 (two illustrated for two active resource providers 116 by way of illustration only—there may be more or fewer depending on how many resource providers 116 are currently in service). In addition, the resource provider lifecycle manager 218 may also be in communication with secrets 232, such as Kubernetes secrets, that are created together with the service 228 or 230 (e.g., one-to-one relationship between Kubernetes secrets and service 228 or 230), and deployment for the resource providers 116. Thus, while one secrets 232 is illustrated, it may be in communication with both resource providers 116, and/or exist as distinct secrets 232, one for each resource provider 116.

The resource provider service 112 may also include resource provider (RP) proxy 220 and RP proxy 222. Two RP proxies 220 and 222 are illustrated to correspond with the two instantiated resource providers 116 illustrated in FIG. 2. There may be a different RP proxy dynamically created each time another resource provider 116 is instantiated from a client command, and deleted when the corresponding resource provider 116 (that is, a resource provider instance) is deleted by client command. In some implementations, the RP proxies 220 and/or 222 may be optional, with some or all of the components within the resource provider service 112 logically communicating with the instantiated resource providers 116. The resource provider service 112 may also include internal APIs 224, which may refer to resource create/update/delete (also referred to as CRUD) operations that a given resource provider 116 may call within the resource provider service 112. Generally, the internal APIs 224 may refer to internal API REST endpoints, or internal API handlers. As illustrated, the internal APIs 224 are in communication with the instantiated resource providers 116 so that they may make the internal API calls, with communication with the object model service 114 via OMS client 216. While illustrated as communicating with the object model service 114 via OMS client 216, as noted above where OMS client 216 is not included, the internal APIs 224 may still communicate logically with the object model service 114 via some other path. As noted above, in some examples, only resource provider 116 instances that derived from a resource provider definition that defined a given data format may alter the contents of the record(s) conforming to that format (e.g., via internal APIs 224), while any resource provider 116 instances (e.g., those that are not derived from that resource provider definition) may read the contents of sub-components of objects (again, e.g. via internal APIs 224).

API 202 may refer to a resource provider service management API, which may be used in cooperation with an in-cluster command (e.g., to cluster 226), such as a command defined in a command-line program for interaction (e.g., via HTTP/HTTPS), that can go through the set of resource provider service system APIs and may be in communication with the OMS client 216. API 202 may be used for the management of the resource provider service 112 and, in some embodiments, may further be used to assist in the installation and deletion of resource providers (e.g., in cooperation with API 208 and/or API 210).

API 204 may refer to a notifications API. This may include APIs used for notification handling for the resource provider service 112. API 206 may refer to an activity log API, which may include APIs used for activity log handling for the resource provider service 112. These may be used for activity and audit logging. For example, a resource provider 116 may wish to have endpoint actions for operations such as POST, PUT, and/or DELETE (to name a few) be recorded in an activity log. If so, the resource provider 116 may expose properties such as activity messages including a summary, a message, a failure message, and/or tags. While not illustrated in FIG. 2, one or both of APIs 204 and 206 may also be available to resource providers 116, and therefore there may be an additional connection from resource providers 116 to APIs 204/206 (e.g., directly, or through other components such as service(s) 228/230, resource lifecycle manager 218, and/or object model service 114.

API 208 may refer to a resource provider definition API. This may include APIs used for adding new resource provider definitions to the object model service 114 via OMS client 216. This includes APIs for retrieving definitions from the object model service 114 to modify existing definitions, as well as APIs for storing definitions newly provided from clients of the cluster 101 that are validated (e.g., against the schemas in cooperation with the object model service 114). As noted above, the resource provider lifecycle manager 218 may be used as the interface with the resource provider definition API (API 208) to communicate with the object model service 114.

API 210 may refer to a resource provider instance API. This may include APIs used for instantiating a resource provider 116 via a resource provider definition stored in object model service 114. The API 210 may also be managed via the resource provider lifecycle manager 218, and thus the API 210 may be in communication with the object model service 114 through the resource provider lifecycle manager 218 and the OMS client 216. These APIs include those capabilities for handling the instantiation of a resource provider from the information stored in the object model service 114 and parameters included with the client command making the API call via API 210 to instantiate a resource provider 116.

API 212 may refer to a resource provider's create, update, and delete (CRUD) API. This may refer to API calls to operations that may be called during actual use of a given resource provider 116. The CRUD APIs therefore refer to those API commands that are proxied by the resource provider service 112 on behalf of any resource providers 116 current in service on behalf of given resources. This is why API 212 is illustrated as being in communication with RP proxy 220 and RP proxy 222. When a client sends an API command for resource provider 116 connected to RP proxy 220, the resource provider service 112 functions as a proxy for the command, described above as the resource provider service 112 proxying an interface of the resource provider 116 instance to client. Further, when a client sends an API command, the resource provider service 112 may limit passage of API calls to only those for which the resource provider service 112 has validated the client's identity and determined that the client has permission to use that API.

API 214 may refer to a resource retrieval API. This may include APIs to get a resource provider definition from the object model service 114 via the OMS client 216 (e.g., where included). As such, the API 214 may be the mechanism by which the resource provider service 112 proxies read access to objects within the object model service 114 (such as resource provider definitions and/or resource provider instance state tracking object(s)). More generally, the API 214 may expose functionality for retrieval of all objects in the object model service 114. The API 214 may allow for some selectivity in the returned information, including ensuring that only permitted objects are returned to the requesting party. For example, a user may use the API 214 as the general path for learning about the state maintained within the system by one or more resource providers 116 (including changes to the state of one or more aspects of the system that reflect one or more changes triggered via corresponding resource provider 116 instance(s) that received appropriate command(s)).

As can be seen from the illustrated aspects of FIG. 2, a resource provider service 112 may be API driven, and may handle not only its own API but also proxied APIs of one or more resource providers 116 that the resource provider service 112 has instantiated.

Figure 4:
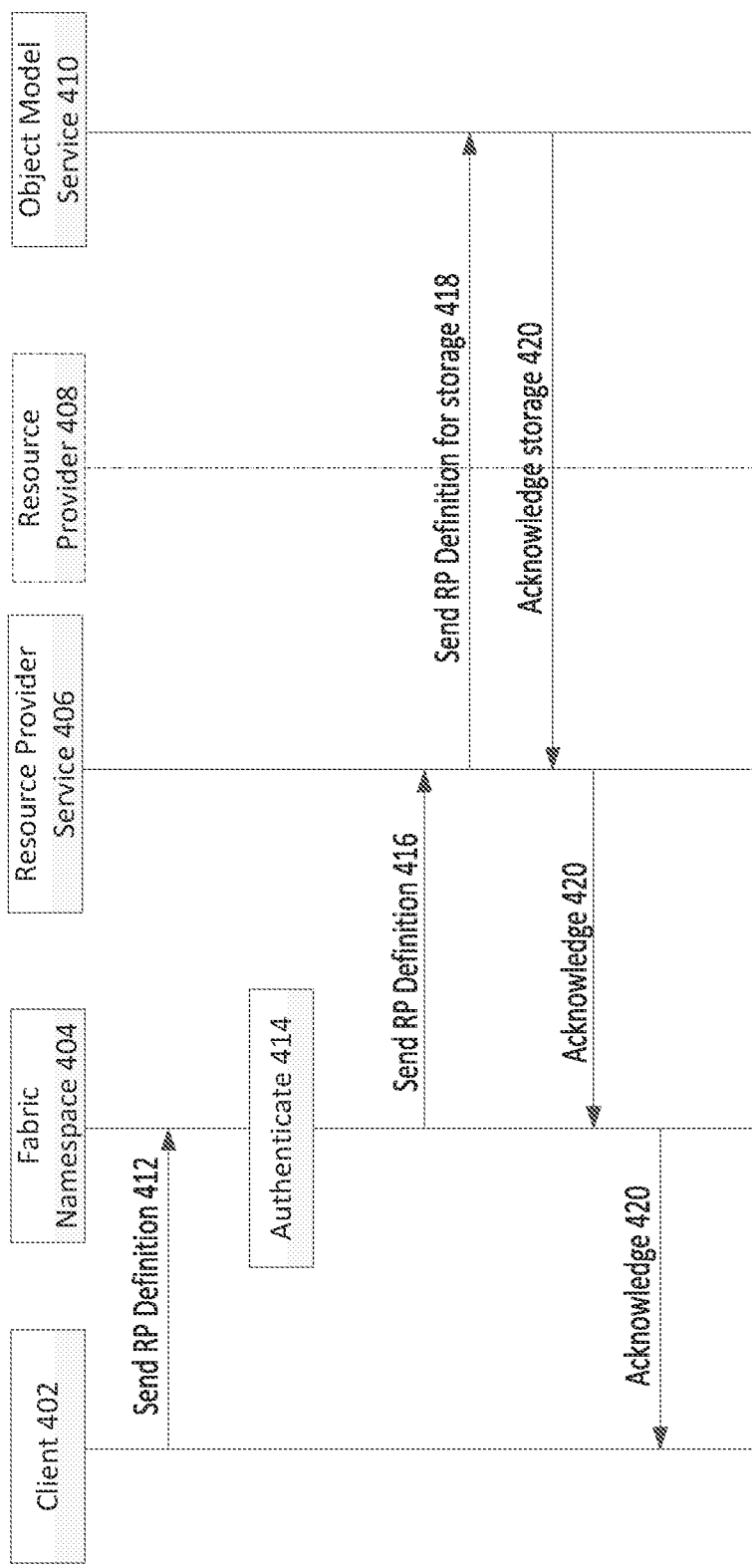
FIG. 4 illustrates an exemplary process flow for providing new resource provider definitions to a resource provider service according to some embodiments of the present disclosure.

Turning now to FIG. 4, an exemplary process flow 400 for providing new resource provider definitions to a resource provider service according to some embodiments of the present disclosure. FIG. 4 illustrates the flow 400 between different elements including a client 402, a fabric namespace 404, a resource provider service 406, a resource provider 408 (illustrated as optional in FIG. 4 as per the example given with respect to FIG. 4, a resource provider is not used in aspects related to adding a resource provider definition), and an object model service 410. Client 402 may be an example of the clients, customers, and/or consumers described above with respect to FIG. 1 and FIG. 2. Fabric namespace 404 may be an example of fabric namespace 102, through which client 402 interacts. Resource provider service 406 may be an example of resource provider service 112 within a given namespace 110 in cluster 101 of FIG. 1. Resource provider 408 may be an example of a resource provider 116 instance from FIG. 1 or 2. Object model service 410 may be an example of object model service 114 from FIG. 1 or 2.

At action 412, the client 402 sends a resource provider definition to the fabric namespace 404. The client 402 may do so via user interface 104, for example. The resource provider definition may include, for example, one or more resource schemas, an API definition (such as an OpenAPI definition), a resource image (deployment) specification, and a mapping file. For example, the resource provider definition may include a JSON object and associated external references to an executable, such as an executable container. The container may be the executable to be run for each resource provider 408 that is instantiated from that resource provider definition. The JSON object may include a reference to a repository location (such as a Docker repository location) from where the executable container can be downloaded. The JSON object may also include the credentials used for accomplishing a download of the container, as well as a schema describing configuration arguments (such as schema stanza 304 from FIG. 3, those needed to craft a unique resource provider 408 instance from the resource provider definition from the object model service 410), a set of mandatory configuration arguments (such as network ports), an API specification (such as OpenAPI or OAS3), that is a definition of the API (e.g., a REST API or other API) implemented by the executable container, and JSON schema definitions of resource objects to be managed by the instantiated resource provider 408.

At action 414, the fabric namespace 404 may authenticate the request from the client 402. This may be performed, for example, by fabric API service 108 (FIG. 1) of fabric namespace 404, which may authenticate against the incoming request's token.

At action 416, upon authentication, the fabric namespace 404 sends the request (e.g., the resource provider definition) to the appropriate organization's resource provider service 406. That may correspond to a namespace 110 for that organization. The fabric API service 108 may be the mechanism by which the fabric namespace 404 sends the authenticated request to the appropriate resource provider service 406.

At action 418, the resource provider service 406 sends the resource provider definition received from action 416 (from the client 402 originally at action 412) to the object model service 410 for storage for later access and use for instantiating one or more resource provider 408 instances. This may be sent using the resource provider definition API 208 illustrated in FIG. 2, such that the resource provider lifecycle manager 218 may be used to actually store the new resource provider definition from the client 402 in the object model service 410.

At action 420, the object model service 410 may acknowledge storage of the resource provider definition back to the resource provider service 406. This may be done, for example, via the OMS client 216 and resource provider lifecycle manager 218 illustrated in FIG. 2. Action 420 may further include passing the acknowledgment on from the resource provider service 406 to the fabric namespace 404, which serves as the interface between the cluster 101 (FIG. 1) and the client 402 for completing the acknowledgment notification to the client 402.

As a result of process flow 400, a new resource provider definition is placed within the object model service 410 and may be later accessed/used to list available resource provider definitions to the same client 402 or other clients of the cluster 101, as well as used to instantiate a resource provider instance to manage desired resources according to embodiments of the present disclosure. Aspects of flow 400 may also be used to modify resource provider definitions already within the object model service 410.

Figure 5:
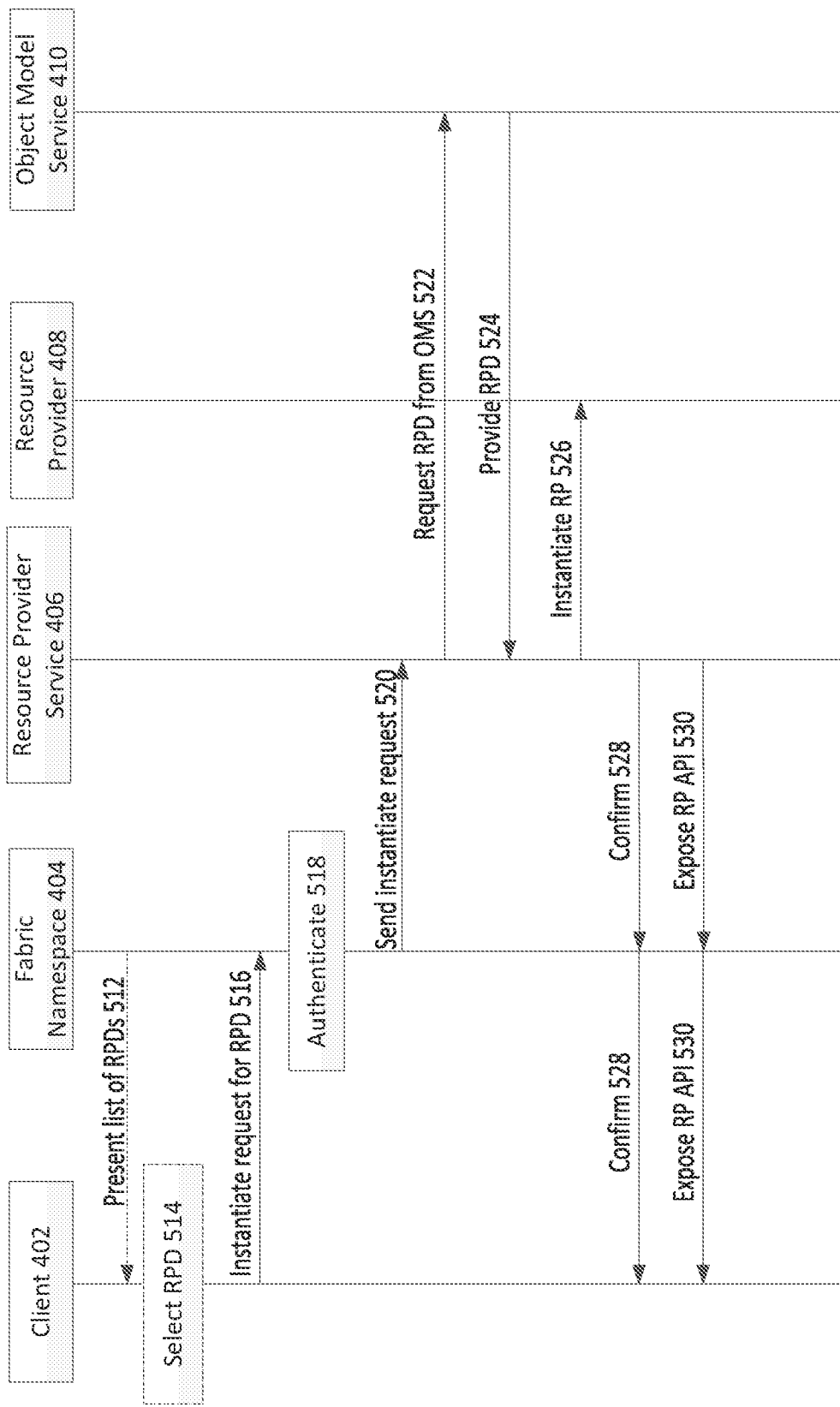
FIG. 5 illustrates an exemplary process flow for instantiating a resource provider based on a resource provider definition from a resource provider service according to some embodiments of the present disclosure.

An example of instantiating a resource provider instance is provided in FIG. 5, which illustrates an exemplary process flow 500 for instantiating a resource provider based on a resource provider definition from a resource provider service according to some embodiments of the present disclosure. The flow 500 is illustrated with respect to the exemplary client 402, fabric namespace 404, resource provider service 406, resource provider 408, and object model service 410 introduced with respect to FIG. 4 above.

At action 512, the fabric namespace 404 presents a list of available resource provider definitions to the client 402. This may be presented, for example, via the user interface 104 (FIG. 1) after accessing the list from the object model service 410 either dynamically in response to a request from the client 402, or based on a list that may be kept by the fabric namespace 404 and updated as definitions within the object model service 410. In other words, the list may be dynamically generated each time a request for a list is received from a client 402, or may be maintained as a live list whether or not a client 402 has requested it to speed up provision of the list to a requesting client 402. Where the client 402 already knows what resource provider definition it wants and can specify it with appropriate parameters, action 512 may be optional.

At action 514, the client 402 may select a resource provider definition that the client 402 desires to instantiate. This may be done by selecting a resource provider definition from the list presented at action 512, or alternatively may be done without reference to a list, to name a few examples.

At action 516, the client 402 may send an instantiation request for the selected resource provider definition to the fabric namespace 404 (e.g., via user interface 104 of FIG. 1). The instantiation request may include a command in the form of an API call. The command from the client 402, such as an API call, may define the necessary configuration parameters to use to instantiate the resource provider 116 from the definition. The API call may be an API call using the API 210 from FIG. 2, for example.

At action 518, the fabric namespace 404 may authenticate the instantiation request from the client 402. This may be performed, for example, by fabric API service 108 (FIG. 1) of fabric namespace 404, which may authenticate against the incoming request's token (e.g., an auth0 token). As used herein, a token may refer to a data item constructed in such a manner that it constitutes proof of the presenter's identity. This may be implemented a variety of ways, of which the Auth0 service is an example. To add more protection with authentication, the browser of the client 402 performing the access may undertake action(s) so the rest of the system may trust the browser, and/or an encrypted connection may be used between the client 402 and the system (e.g., fabric API service 108 of fabric namespace 404).

At action 520, in response to authenticating, the fabric namespace 404 may send the request (e.g., the instantiation request based on a resource provider definition) to the appropriate organization's resource provider service 406. That may correspond to a namespace 110 for that organization, which may have its own resource provider service 406. The fabric API service 108 may be the mechanism by which the fabric namespace 404 sends the authenticated request to the appropriate resource provider service 406. The resource provider service 406 may receive the request via the API 210, such as managed by the resource provider lifecycle manager 218 of FIG. 2.

At action 522, the resource provider service 406 requests the identified resource provider definition from the object model service 410. This may be performed, for example, by the resource provider lifecycle manager 218 accessing the resource provider definition via the OMS client 216 of FIG. 2.

At action 524, the object model service 410 may provide the requested resource provider definition to the resource provider service 406. This may be provided, for example, via the OMS client 216 and resource provider lifecycle manager 218 of FIG. 2.

With this information, including a JSON object and associated external references to an executable, such as an executable container, a resource provider 408 may be instantiated from the definition. At action 526, the resource provider service 406 instantiates the resource provider 408 as an instance from the resource provider definition retrieved from the object model service 410 based on the instruction from the client 402. In general, this may refer to instantiating an abstracted infrastructure component, which in some examples may occur using a container orchestration system, such as Kubernetes, while in other examples this may occur using virtual machines (instead of containers). Generally, at action 526 the resource provider service 406 contacts the service and causes the appropriate executable derived from the resource provider definition to run.

For example, the resource provider service 406 may use the configuration information from the stored resource provider definition selected to install secrets 232, such as Kubernetes secrets, service 228 (or 230), and a deployment for the instantiating resource provider 408. The resource provider can accept optional instantiation arguments as environment variables, as an example. In this manner, the configuration of the executable for the resource provider definition may be customized to meet the needs of the instance requested by the instantiation request sent at action 516. Configuration information may be delivered via Kubernetes secrets as one example; in other examples, the configuration information may be delivered via environment variables, Kubernetes configmaps, one or more files, some combination of these examples, etc.

At action 528, the resource provider service 406 may confirm the instantiation of the resource provider 408 via the fabric namespace 404 to the client 402. For example, this may be performed via the API 210 as well.

At action 530, the resource provider service 406 may expose the APIs of the instantiated resource provider 408 to the client 402 via the fabric namespace 404. This may be done, for example, using the API 212 (e.g., the resource provider's create, update, and delete (CRUD) API). This exposure allows the client 402 to make API calls to operations during actual use of the resource provider 408. These are commands that the resource provider service 406 may proxy for the resource provider 408 during operation, as discussed above and further below.

Figure 6:
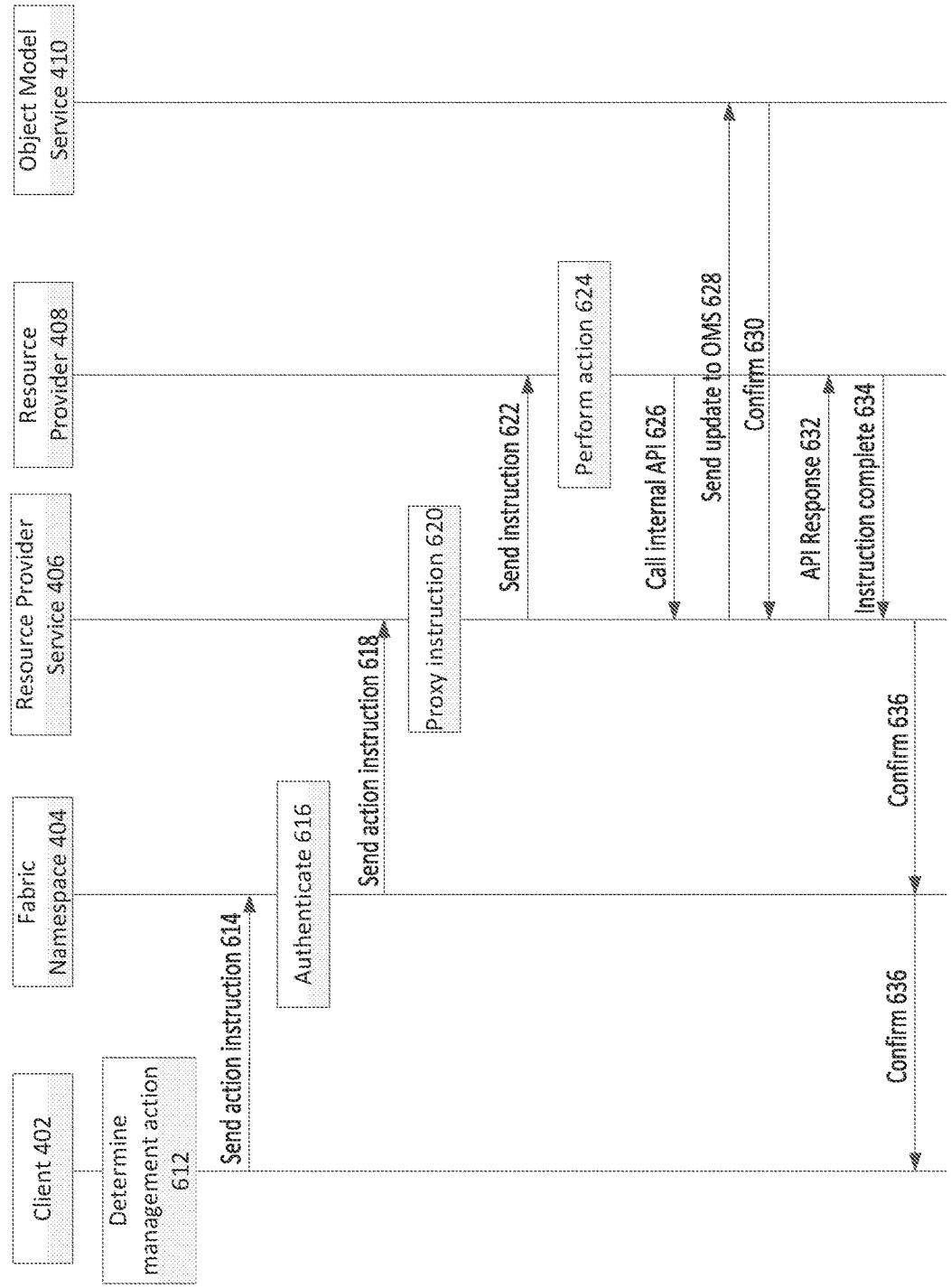
FIG. 6 illustrates an exemplary process flow for managing data of a resource provider via a resource provider service proxy according to some embodiments of the present disclosure.

For example, FIG. 6 illustrates an exemplary process flow 600 for managing data of a resource provider via a resource provider service proxy according to some embodiments of the present disclosure. The flow 600 is illustrated with respect to the exemplary client 402, fabric namespace 404, resource provider service 406, resource provider 408, and object model service 410 introduced with respect to FIGS. 4 and 5 above.

At action 612, client 402 determines a management action to perform for the resource(s) managed/represented by the resource provider 408 instance. Examples of resources being managed may include the state of a system, or a group of systems. An example of a management action and/or operation may include changing the state of a system or group of systems in a particular manner as supported by the API of a resource provider instance. In general, in order to cause a management action to occur, the client 402 may determine what object (resource) it seeks to manipulate, may select a compatible operation at the resource provider 408 instance that manages the object (resource), and then may submit the appropriate information for the operation to then be performed.

Some simple examples of resources may be "volumes" and "snapshots" (as two simple separate examples). As such, a resource provider 408 may be a representation of the underlying resource(s) that provides a level of access/management at the given level of granularity for that resource per the resource provider definition from which the resource provider 408 is instantiated (e.g., the management action may be an action that is supported by the resource provider 408 instance).

At action 614, the client 402 sends the instruction for action determined at action 612 to the fabric namespace 404 (e.g., via the user interface 104 of FIG. 1).

At action 616, the fabric namespace 404 may authenticate the instantiation request from the client 402. This may be performed, for example, by fabric API service 108 (FIG. 1) of fabric namespace 404, which may authenticate against the incoming request's token (e.g., an auth0 token).

At action 618, in response to authenticating, the fabric namespace 404 may send the instruction (e.g., the management action specified by the client 402 at action 612) to the appropriate organization's resource provider service 406. The fabric API service 108 may be the mechanism by which the fabric namespace 404 sends the authenticated instruction to the appropriate resource provider service 406. The resource provider service 406 may receive the request via the API 212.

At action 620, the resource provider service 406 may proxy the instruction for the resource provider 408 that is the endpoint of the instruction. This may be done, for example, with the RP proxy 220 or 222 illustrated in FIG. 2. As described previously, this represents the resource provider service 406 proxying an interface of the resource provider 408 instance to the client 402.

At action 622, the instruction is conveyed to the resource provider 408 instance after proxying by the resource provider service 406.

At action 624, the resource provider 408 may perform the action specified by the instruction that had been proxied by the resource provider service 406. Performing the action may include an update to the actual physical entity(ies) managed by the resource provider 408. As one example, where a resource provider 408 receives a command to cause an object to be created, that object would be created at the actual physical entity(ies) via the resource provider 408. As another example, where the resource provider 408 represents an NFS file server and the specified action is for a storage volume to be created, an actual corresponding volume would be created at the actual, managed NFS file server.

At action 626, upon completing the action specified by the instruction at action 624, the resource provider 408 may call an API to update one or more aspects of the state of the resource provider 408 being tracked in the object model service 410. This may be a call to the internal APIs 224, such as may be a CRUD API for the resource provider 408.

At action 628, using the internal API 224, the resource provider 408 may send the update to the object model service 410 for updating one or more tracking data structures to record the change to the configuration for this particular resource provider 408 instance and any details and/or metadata related to the change. This may result in the resource provider 408 calling the internal API 224, such as a CRUD API, via the resource provider service 406.

At action 630, the object model service 410 may confirm that the update sent at action 628 was stored/updated within the object model service 410. The confirmation may be returned to the resource provider service 406 as a proxy for the resource provider 408.

At action 632, the resource provider service 406 may send a response to the internal API 224 called at action 626, which is sent to the resource provider 408 which had originally made the internal API 224 call.

At action 634, the resource provider 408 may send an instruction response to the resource provider service 406, indicating completion of the instruction that the resource provider 408 received from the resource provider service 406 at action 622.

At action 636, either at the same time or after confirming the update via the internal API 224 and/or indicating completion of the instruction at action 634, the resource provider service 408 may confirm to the client 402 that the action requested by the client's instruction has been performed. This may be sent via the fabric namespace 404 to the client 402, and may be done at the same time, before, or after any one or more of actions 628-636.

In addition to the exemplary action described with respect to FIG. 6, a client 402 may also instruct the resource provider service 406 to deinstantiate the resource provider 408. Following the flow described above, in such situation, the resource provider service 406 may (e.g., via the resource provider lifecycle manager 218 and API 210/212) delete any relevant configuration objects (such as the secrets 232 in FIG. 2), stop execution of the resource provider 408, delete the service 228/230 (whichever corresponds to the exemplary resource provider 408; service 228 and service 230 are just examples corresponding to two exemplary resource provider instances in FIG. 2, while any number of services corresponding to a respective number of instantiated resource provider instances may exist, such as in examples with Kubernetes deployment), and also delete the deployment of the resource provider 408. Any resource(s) that the resource provider 408 created or managed may then be orphans (that is, any remaining resource(s) after deletion may be unmanageable orphans within the system). The resource provider service 406 may also update internal recordkeeping, such as to stop proxying the API of the resource provider 408 instance that has been deinstantiated.

As another example, the client 402 may also request deletion of the resource provider definition in object model service 410. The flow may follow as described above, including calling the APIs 208. The resource provider service 406 may cause the resource provider definition to be removed from object model service 410 via resource provider lifecycle manager 218 and OMS client 216, for example. This may coincide, for example, with situations where there are no existing/running resource provider instances running based on that resource provider definition (e.g., if client 402 requested deletion of the resource provider definition while one or more resource provider instances still exist that originated from it, the request might be denied).

Figure 7:
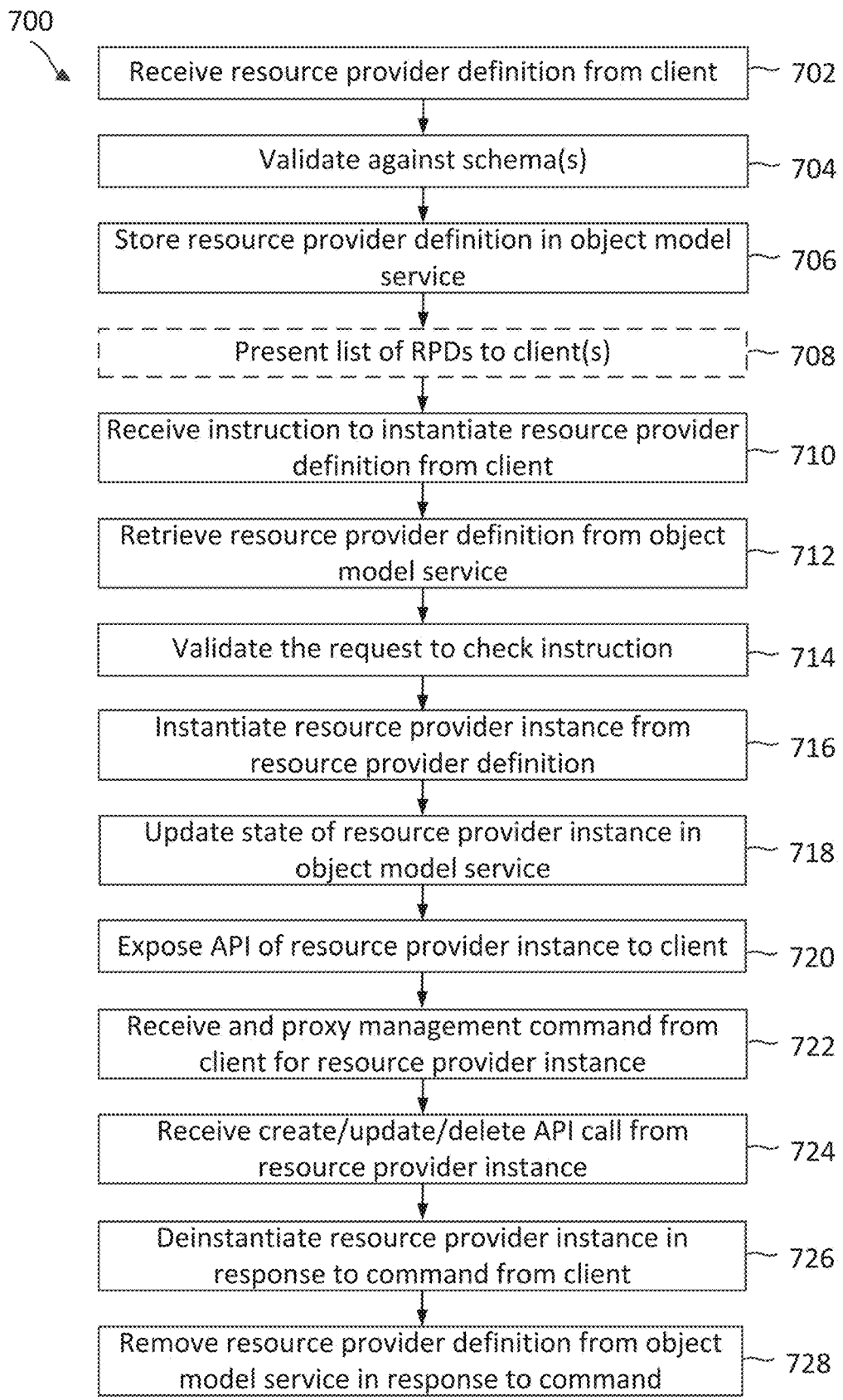
FIG. 7 illustrates a method for managing data through a resource provider service according to some embodiments of the present disclosure.

Turning to FIG. 7, a flow diagram of an exemplary method 700 for managing data through a resource provider service is illustrated according to embodiments of the present disclosure. In the description of FIG. 7, reference is made to the elements of FIGS. 1 and 2 for simplicity of illustration. In an embodiment, the method 700 may be implemented by an exemplary resource provider service 112/406. An exemplary resource provider service 112/406 may be implemented, for example, as a container within the cluster 101, in a given namespace 110. It is understood that additional steps can be provided before, during, and after the steps of method 700, and that some of the steps described can be replaced or eliminated for other embodiments of the method 700.

At block 702, the resource provider service 112 may receive a resource provider definition from a client, such as a client 402. This may alternatively refer to receiving an edit to an existing resource provider definition within object model service 114. This may include aspects described above with respect to action 412 of FIG. 4 and with respect to FIGS. 1 and 2.

At block 704, the resource provider service 112 may validate the resource provider definition received at block 702. This may include, for example, validating that the configuration of the resource provider definition meets the requirements specified by one or more schemas maintained by the object model service 114, such as, for example, a meta schema that indicates what schema stanzas an exemplary object may contain. This may be used to avoid accepting, storing, and applying an illegal schema, as well as to allow evolution of how objects may be represented over time.

At block 706, the resource provider service 112 may store the resource provider definition (or, in examples where it is a modification of an existing definition, the changes to that definition) in the object model service 114, for example in response to the resource provider definition having been validated at block 704. This may include one or more of the actions 414-420 described with respect to FIG. 4 above. If the resource provider definition was not validated at block 704, the resource provider service 112 may indicate the rejection to the client 402 (e.g., which in some examples may include feedback regarding why a resource provider definition was rejected) and proceed as laid out above and/or further below with respect to other requests.

At block 708, the resource provider service 112 may present a list of available resource provider definitions to a requesting client 402. This may be done via a fabric namespace (e.g., a user interface thereof) as described with respect to action 512 of FIG. 5. This may include listing resource provider definitions provided to the object model service from any client, whether the same client, a client from the same organization, or a third party organization. Block 706 is illustrated as optional in case the client 402 already knows what resource provider definition it is looking for and can specify it without looking at a list.

At block 710, the resource provider service 112 may receive an instruction to instantiate a resource provider definition from client 402. This may be for a resource provider definition selected from a list as presented at block 706, or otherwise as specified by the client 402, for example as described with respect to at least action 516 of FIG. 5 above.

At block 712, the resource provider service 112 may retrieve the specified resource provider definition from the object model service 114, for example as discussed with respect to action 518-524 of FIG. 5 above.

At block 714, the resource provider service 112 may validate the instruction(s) received at block 710, for example against the formats for arguments that may exist with the resource provider definition retrieved at block 712 (and, e.g., validation that the instance definition values that can be set, such as configuration values, are valid based on a configuration stanza in the resource provider definition).

At block 716, the resource provider service 112 may instantiate a resource provider 116 instance based on the resource provider definition and any parameters further included in the request. This may be an example of actions 526-528 of FIG. 5 above.

At block 718, the resource provider service 112 may update the state of the resource provider instance in the object model service 114 in response to instantiation at block 716. This may correspond, for example, to updating one or more tracking data structures in the object model service 114 to record the configuration for this particular resource provider instance and any details and/or metadata of that instantiation.

At block 720, the resource provider service 112 may expose the API of the resource provider 116 instance to the client 402 for management, such as described with respect to action 530 of FIG. 5 above. This may be done, for example, using the API 212 (e.g., the resource provider's create, update, and delete (CRUD) API). This exposure allows the client 402 to make API calls to operations during actual use of the resource provider 408. This API exposure provides access to commands that the resource provider service 406 may proxy for the resource provider 408 during operation, as discussed above and further below.

At block 722, the resource provider service 112 may proxy a management command from the client 402 for the instantiated resource provider 116 instance from block 714. This may include actions 612-624 of FIG. 6 above.

At block 724, the resource provider service 112 may receive a CRUD API call from the resource provider 116 instance in response to the action being performed as commanded at block 722. This may include action 626 of FIG. 6, such as used to instruct the object model service 114 to update one or more aspects of the resource provider definition stored therein related to a resource managed by the resource provider 116 instance. After performing the action(s) specified by the API call, the resource provider service 112 may again update the state of the resource provider instance in the object model service 114, which may be an example of actions 628 and 630 of FIG. 6.

At block 726, the resource provider service 112 may deinstantiate the resource provider 116 instance in response to a command from the client 402. For example, the resource provider service 112 may (e.g., via the resource provider lifecycle manager 218 and API 210/212) delete the secrets 232, delete the service 228/230, and also delete the deployment of the resource provider 116 instance (as described in more detail with respect to FIG. 2 above). Any resource(s) that the resource provider 116 created or managed are now orphans.

At block 728, the resource provider service 112 may remove the resource provider definition from object model service 114 in response to a request for deletion from client 402.

While illustrated as part of the rest of the flow of method 700, aspects of the above may occur separately from each other, or some may occur while others don't at a given point in time. For example, resource provider definition(s) may be received at a time, but no request to instantiate those definitions, or request(s) to instantiate one or more resource provider definitions may be received independent from any definitions received for storage in the object model service 114. As another example, multiple management calls, such as via CRUD API 212, may occur over the life of a resource provider 116 without receiving a deletion command for either the resource provider 116 or the corresponding definition. Further, even when a command is received to deinstantiate a given resource provider 116 instance, it does not mean that there will be a corresponding command to delete the resource provider definition itself. Many resource providers 116 may be instantiated/used/deinstantiated before the underlying resource provider definition is deleted (if ever).

Figure 8:
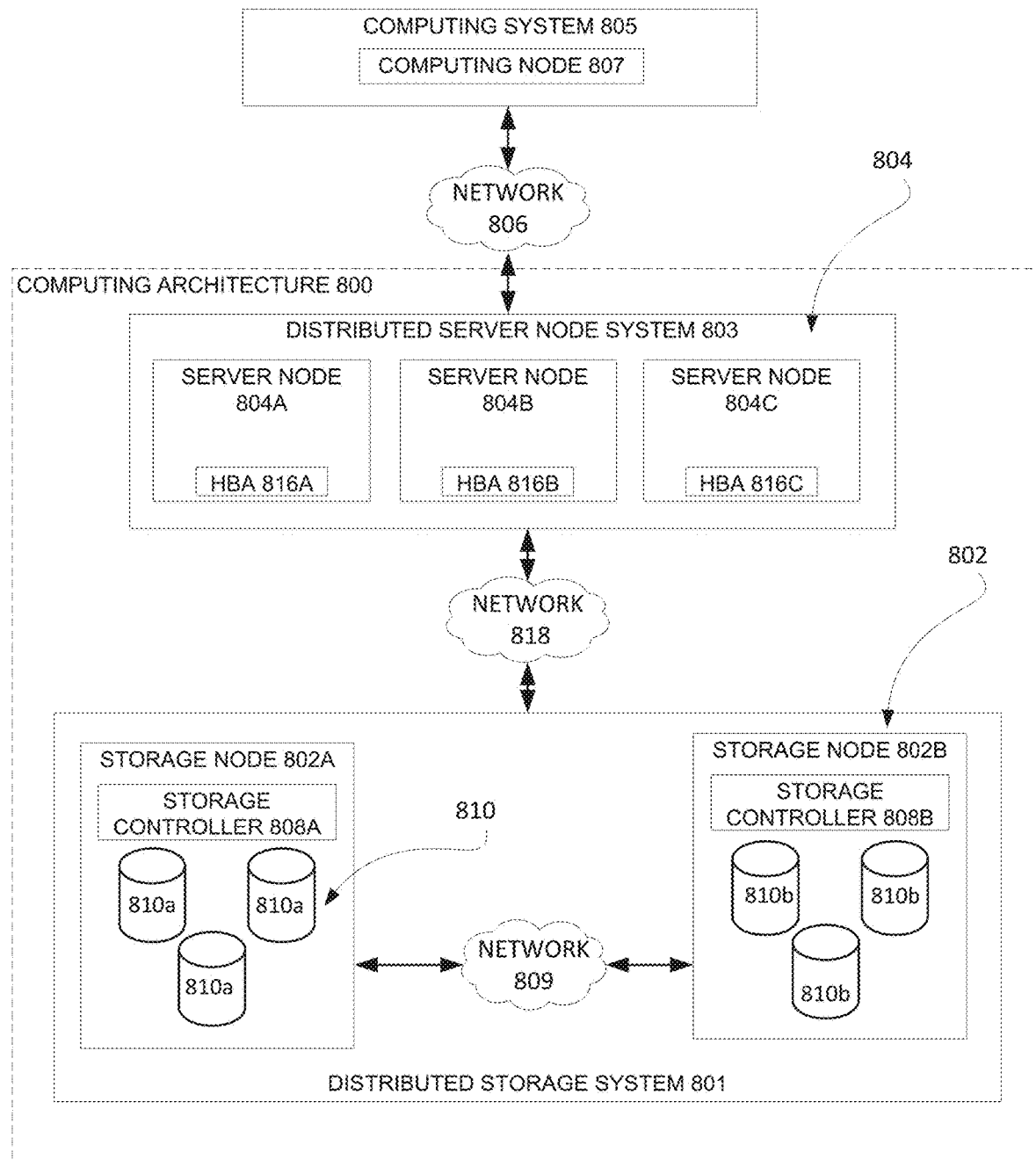
FIG. 8 is an illustration of an exemplary computing architecture according to some embodiments of the present description.

FIG. 8 is an illustration of a computing architecture 800 in accordance with one or more example embodiments. The computing architecture 800 is an example of one manner in which one or more of the computing architectures described herein may be implemented. The computing architecture 800, which, in some cases includes a distributed storage system 801 comprising a number of storage nodes 802 (e.g., storage node 802a, storage node 802b) in communication with a distributed server node system 803 comprising a number of server nodes 804 (e.g., server node 804a, server node 804b, server node 804c). The distributed storage system 801 and the distributed server node system 803 are examples in which containers and controllers of the above figures may be implemented, for example.

A computing system 805 communicates with the computing architecture 800, and in particular, the distributed server node system 803, via a network 806. The network 806 may include any number of wired communications links, wireless communications links, optical communications links, or combination thereof. In one or more examples, the network 806 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 805 may include, for example, at least one computing node 807. The computing node 807 may be implemented using hardware, software, firmware, or a combination thereof. In one or more other examples, the computing node 807 is a client (or client service) and the computing system 805 that the client runs on is, for example, a physical server, a workstation, etc.

The storage nodes 802 may be coupled via a network 809, which may include any number of wired communications links, wireless communications links, optical communications links, or a combination thereof. For example, the network 809 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 809 may use a transmission control protocol/Internet protocol (TCP/IP), a remote direct memory access (RDMA) protocol (e.g., Infiniband®, RDMA over Converged Ethernet (RoCE) protocol (e.g., RoCEv, RoCEv2), iWARP), and/or another type of protocol. Network 809 may be local or remote with respect to a rack or datacenter. Additionally, or in the alternative, the network 809 may extend between sites in a WAN configuration or be a virtual network extending throughout a cloud. Thus, the storage nodes 802 may be as physically close or widely dispersed as needed depending on the application of use. In some examples, the storage nodes 802 are housed in the same racks. In other examples, the storage nodes 802 are located in different facilities at different sites around the world. The distribution and arrangement of the storage nodes 802 may be determined based on cost, fault tolerance, network infrastructure, geography of the server nodes 804, another consideration, or a combination thereof.

The distributed storage system 801 processes data transactions on behalf of other computing systems such as, for example, the one or more server nodes 804. The distributed storage system 801 may receive data transactions from one or more of the server nodes 804 and take an action such as reading, writing, or otherwise accessing the requested data. These data transactions may include server node read requests to read data from the distributed storage system 801 and/or server node write requests to write data to the distributed storage system 801. For example, in response to a request from one of the server nodes 804a, 804b, or 804c, one or more of the storage nodes 802 of the distributed storage system 801 may return requested data, a status indictor, some other type of requested information, or a combination thereof, to the requesting server node. While two storage nodes 802a and 802b and three server nodes 804a, 804b, and 804c are shown in FIG. 8, it is understood that any number of server nodes 804 may be in communication with any number of storage nodes 802. A request received from a server node, such as one of the server nodes 804a, 804b, or 804c may originate from, for example, the computing node 807 (e.g., a client service implemented within the computing node 807) or may be generated in response to a request received from the computing node 807 (e.g., a client service implemented within the computing node 807).

While each of the server nodes 804 and each of the storage nodes 802 is referred to as a singular entity, a server node (e.g., server node 804a, server node 804b, or server node 804c) or a storage node (e.g., storage node 802a, or storage node 802b) may be implemented on any number of computing devices ranging from a single computing system to a cluster of computing systems in communication with each other. In one or more examples, one or more of the server nodes 804 may be run on a single computing system, which includes at least one processor such as a microcontroller or a central processing unit (CPU) operable to perform various computing instructions that are stored in at least one memory. In one or more examples, at least one of the server nodes 804 and at least one of the storage nodes 802 reads and executes computer readable code to perform the methods described further herein. The instructions may, when executed by one or more processors, cause the one or more processors to perform various operations described herein in connection with examples of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

A processor may be, for example, a microprocessor, a microprocessor core, a microcontroller, an application-specific integrated circuit (ASIC), a field programmable gate array (FPGA), etc. The computing system may also include a memory device such as random access memory (RAM); a non-transitory computer-readable storage medium such as a magnetic hard disk drive (HDD), a solid-state drive (SSD), other persistent memory such as storage class memory (SCM), and/or an optical memory (e.g., CD-ROM, DVD, BD); a video controller such as a graphics processing unit (GPU); at least one network interface such as an Ethernet interface, a wireless interface (e.g., IEEE 802.11 or other suitable standard), a SAN interface such as implemented by a Fibre Channel interface (e.g., host bus adapter(s)), an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 802 contains any number of storage devices 810 for storing data and can respond to data transactions by the one or more server nodes 804 so that the storage devices 810 appear to be directly connected (i.e., local) to the server nodes 804. For example, the storage node 802a may include one or more storage devices 810a and the storage node 802b may include one or more storage devices 810b. In various examples, the storage devices 810 include HDDs, SSDs, and/or any other suitable volatile or non-volatile data storage medium. In some examples, the storage devices 810 are relatively homogeneous (e.g., having the same manufacturer, model, configuration, or a combination thereof). However, in other example, one or both of the storage node 802a and the storage node 802b may alternatively include a heterogeneous set of storage devices 810a or a heterogeneous set of storage device 810b, respectively, that includes storage devices of different media types from different manufacturers with notably different performance.

The storage devices 810 in each of the storage nodes 802 are in communication with one or more storage controllers 808. In one or more examples, the storage devices 810a of the storage node 802a are in communication with the storage controller 808a, while the storage devices 810b of the storage node 802b are in communication with the storage controller 808b. While a single storage controller (e.g., 808a, 808b) is shown inside each of the storage node 802a and 802b, respectively, it is understood that one or more storage controllers may be present within each of the storage nodes 802a and 802b.

The storage controllers 808 exercise low-level control over the storage devices 810 in order to perform data transactions on behalf of the server nodes 804, and in so doing, may group the storage devices 810 for speed and/or redundancy using a protocol such as RAID (Redundant Array of Independent/Inexpensive Disks). The grouping protocol may also provide virtualization of the grouped storage devices 810. At a high level, virtualization includes mapping physical addresses of the storage devices 810 into a virtual address space and presenting the virtual address space to the server nodes 804, other storage nodes 802, and other requestors. Accordingly, each of the storage nodes 802 may represent a group of storage devices as a volume. A requestor can therefore access data within a volume without concern for how it is distributed among the underlying storage devices 810.

The distributed storage system 801 may group the storage devices 810 for speed and/or redundancy using a virtualization technique such as RAID or disk pooling (that may utilize a RAID level). The storage controllers 808a and 808b are illustrative only; more or fewer may be used in various examples. In some cases, the distributed storage system 801 may also be communicatively coupled to a user display for displaying diagnostic information, application output, and/or other suitable data.

With respect to the distributed server node system 803, each of the one or more server nodes 804 includes any computing resource that is operable to communicate with the distributed storage system 801, such as by providing server node read requests and server node write requests to the distributed storage system 801. In one or more examples, each of the server nodes 804 is a physical server, while in other examples each of the server nodes 804 may be virtual machines. In one or more examples, each of the server nodes 804 includes one or more host bus adapters (HBA) 816 in communication with the distributed storage system 801. The HBA 816 may provide, for example, an interface for communicating with the storage controllers 808 of the distributed storage system 801, and in that regard, may conform to any suitable hardware and/or software protocol. In various examples, the HBAs 816 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 816 of the server nodes 804 may be coupled to the distributed storage system 801 by a network 818 comprising any number of wired communications links, wireless communications links, optical communications links, or combination thereof. For example, the network 818 may include a direct connection (e.g., a single wire or other point-to-point connection), a networked connection, or any combination thereof. Examples of suitable network architectures for the network 818 include a LAN, an Ethernet subnet, a PCI or PCIe subnet, a switched PCIe subnet, a WAN, a MAN, the Internet, Fibre Channel, or the like. In many examples, a server node 804 may have multiple communications links with a single distributed storage system 801 for redundancy. The multiple links may be provided by a single HBA 816 or multiple HBAs 816 within the server nodes 804. In some examples, the multiple links operate in parallel to increase bandwidth.

In one or more examples, each of the server nodes 804 may have another HBA that is used for communication with the computing system 805 over the network 806. In other examples, each of the server nodes 804 may have some other type of adapter or interface for communication with the computing system 805 over the network 806.

To interact with (e.g., write, read, modify, etc.) remote data, a HBA 816 sends one or more data transactions to the distributed storage system 801. Data transactions are requests to write, read, or otherwise access data stored within a volume in the distributed storage system 801, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 801 executes the data transactions on behalf of the server nodes 804 by writing, reading, or otherwise accessing data on the relevant storage devices 810. A distributed storage system 801 may also execute data transactions based on applications running on the distributed server node system 803. For some data transactions, the distributed storage system 801 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 801 to the distributed server node system 803, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    instantiating, by a resource provider service, a resource provider instance that is based on a resource provider definition maintained by the resource provider service, the resource provider instance controlling access to an associated physical resource, and the resource provider definition comprising a data format, a resource provider application programming interface (API), and reference to an executable container for the resource provider instance;
    exposing, by the resource provider service, the API for the resource provider instance for access from a client according to the resource provider definition;
    proxying, by the resource provider service, a command from the client to the resource provider service for the resource provider instance, the command configured according to the resource provider API to manage the associated physical resource; and
    updating, by the resource provider service, a state of the associated physical resource within an object model service associated with the resource provider service based on the command.

2. The method of claim 1, further comprising:
    accepting, prior to the instantiating, the resource provider definition in the object model service upon receipt of the resource provider definition.

3. The method of claim 1, wherein the resource provider definition is formatted according to a common schema.

4. The method of claim 1, further comprising:
    exposing, by the resource provider service, a resource provider service API with one or more functions that facilitate at least one of the instantiating of the resource provider instance, accepting a new resource provider definition, making an accepted resource provider definition available, or managing what resource provider definition is running.

5. The method of claim 1, further comprising:
    receiving, by the resource provider service prior to the instantiating, an instruction to instantiate the resource provider instance, the instruction including an identification of the resource provider definition and a configuration parameter.

6. The method of claim 1, wherein the resource provider service is configured to operate within a namespace for a tenant from among a plurality of namespaces, each comprising a respective instance of the resource provider service.

7. The method of claim 1, further comprising:
    deleting, by the resource provider service, the resource provider definition in response to a command according to a resource provide service API exposed by the resource provider service.

8. A computing device comprising:
    a memory containing machine readable medium comprising machine executable code having stored thereon instructions for performing a method of providing proxied access to an associated physical resource in a container system by a resource provider service;
    a processor coupled to the memory, the processor configured to execute the machine executable code to cause the processor to:
        present, via a first resource provider service application programming interface (API) of the resource provider, a list of resource provider definitions to a client;
        instantiate, via a second resource provider service API, a resource provider instance that is based on a resource provider definition selected from the list of resource provider definitions, the resource provider instance controlling access to the associated physical resource, the resource provider definition comprising s data format, a resource provider application programming interface (API), and reference to an executable container for the associated physical resource for the resource provider instance; and
        proxy a command from the client to the resource provider service for the resource provider instance, the command configured according to a resource provider API for the resource provider instance exposed by the resource provider service to manage the associated physical resource.

9. The computing device of claim 8, wherein the processor is further configured to:
    update a state of the associated physical resource within an object model service associated with the resource provider service.

10. The computing device of claim 8, wherein the processor is further configured to:
    store, prior to presenting the list, the resource provider definition in an object model service via a third resource provider service API.

11. The computing device of claim 8, wherein the resource provider definition is formatted according to a common schema.

12. The computing device of claim 8, wherein the resource provider service is configured to operate within a namespace from among a plurality of namespaces, each comprising a respective instance of the resource provider service.

13. The computing device of claim 8, wherein the processor is further configured to:
    delete, via a fourth resource provider service API exposed by the resource provider service, the resource provider definition from the list of resource provider definitions in response to a command configured according to the fourth resource provider service API.

14. The computing device of claim 8, wherein the processor is further configured to:
    update metadata of the associated physical resource within an object model service associated with the resource provider service in response to an action by a second resource provider instance that is also based on the selected resource provider definition.

15. A non-transitory machine readable medium having stored thereon instructions for performing a method of providing proxied access to an associated physical resource by a resource provider service, comprising machine executable code which when executed by at least one machine, causes the machine to:
    expose a resource provider application programming interface (API) for a resource provider instance for access from a client, the resource provider instance being based on a resource provider definition maintained by the resource provider service and controlling access to the associated physical resource, the resource provider definition comprising a data format, the resource provider API, and reference to an executable container for the resource provider instance;

proxy a command from the client to the resource provider service for the resource provider instance, the command configured according to the resource provider API to manage the associated physical resource; and update a state of the associated physical resource within an object model service associated with the resource provider service based on the command.

16. The non-transitory machine readable medium of claim 15, further comprising machine executable code that causes the machine to:

store, prior to exposing the resource provider API, the resource provider definition in the object model service upon receipt of the resource provider definition.

17. The non-transitory machine readable medium of claim 15, further comprising machine executable code that causes the machine to:

create, prior to exposing the resource provider API, the resource provider instance based on the resource provider definition in response to the client selecting the resource provider definition from a list of resource provider definitions presented to the client.

18. The non-transitory machine readable medium of claim 15, wherein the resource provider definition is formatted according to a common schema.

19. The non-transitory machine readable medium of claim 15, wherein the resource provider service is configured to operate within a namespace from among a plurality of namespaces, each comprising a respective instance of the resource provider service.

20. The non-transitory machine readable medium of claim 15, further comprising machine executable code that causes the machine to:

create, in response to receipt of an instruction, the resource provider instance based on an identification of the resource provider definition and a configuration parameter in the instruction.

\* \* \* \* \*